United States Patent [19]

Andermo et al.

[11] Patent Number: 5,574,381

[45] Date of Patent: Nov. 12, 1996

[54] SEALED MECHANICAL CONFIGURATION FOR ELECTRONIC CALIPERS FOR RELIABLE OPERATION IN CONTAMINATED ENVIRONMENTS

[75] Inventors: Nils I. Andermo; Kim W. Atherton, both of Kirkland, Wash.

[73] Assignee: Mitutoyo Corporation, Tokyo, Japan

[21] Appl. No.: 369,657

[22] Filed: Jan. 6, 1995

[51] Int. Cl.$^6$ ............................. G01R 27/26; G01B 7/02; G01D 5/24; G08C 19/10

[52] U.S. Cl. .......................... 324/660; 324/688; 324/690; 340/870.37; 33/705; 33/558

[58] Field of Search .................................... 324/660, 661, 324/662, 686, 688, 690; 340/678, 686, 870.37; 33/703, 705, 706, 558

[56] References Cited

U.S. PATENT DOCUMENTS

| Re. 34,741 | 9/1994 | Andermo | 324/690 |
|---|---|---|---|
| 4,420,754 | 12/1983 | Andermo | 324/660 |
| 4,600,203 | 7/1986 | Miller et al. | 33/706 X |
| 4,743,902 | 5/1988 | Andermo | 340/870.37 |
| 4,878,013 | 10/1989 | Andermo | 324/690 |
| 4,879,508 | 11/1989 | Andermo | 324/690 |
| 4,959,615 | 9/1990 | Andermo | 324/690 |
| 5,023,559 | 6/1991 | Andermo | 324/662 |
| 5,053,715 | 10/1991 | Andermo | 324/662 |
| 5,239,307 | 8/1993 | Andermo | 340/870.37 |
| 5,416,424 | 5/1995 | Andermo | 324/684 |
| 5,485,680 | 1/1996 | Nelle | 33/705 |

Primary Examiner—Kenneth A. Wieder
Assistant Examiner—Glenn W. Brown
Attorney, Agent, or Firm—Oliff & Berridge

[57] ABSTRACT

An electronic caliper configuration making such calipers more reliable in the presence of liquid and particulate contaminants. Included in the caliper configuration is an elongated cavity added to the main beam of the caliper. The cavity is sealed with a cover. The measuring scale element of the measuring transducer, and the associated shorter pickoff element are mounted in this cavity. The depth bar, ordinarily attached to the sliding jaw in conventional calipers, is inserted into the cavity through a hole or holes aligned parallel to the longitudinal axis of the caliper and internally joined to the moving transducer element. A conventional lip seal provides an effective seal around the diameter of the depth bar. An external portion of the depth bar is coupled to the sliding jaw of the caliper via axially rigid linkage or alternately an axially rigid flexure. In this way, the internally isolated transducer elements can be actuated by the external sliding caliper jaw. As a result, the measuring transducer elements, which are contamination sensitive, may be isolated within a cavity in a caliper which nearly maintains the preferred, historically proven form and functions to provide an electronic caliper with greatly improved reliability when operating in the traditional industrial shop environment. In one embodiment, the neutral axis of the depth bar is positioned to coincide with the neutral axis of the linkage bars, so that bending of the linkage bars and depth bar does not significantly affect the measurement accuracy.

38 Claims, 16 Drawing Sheets

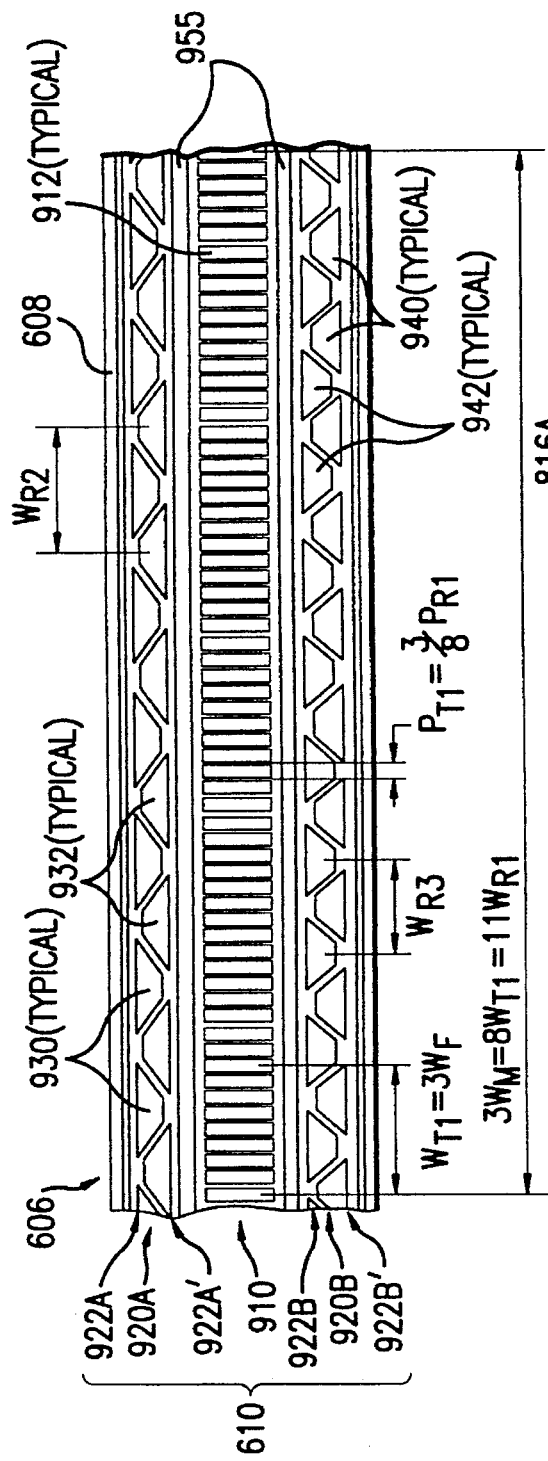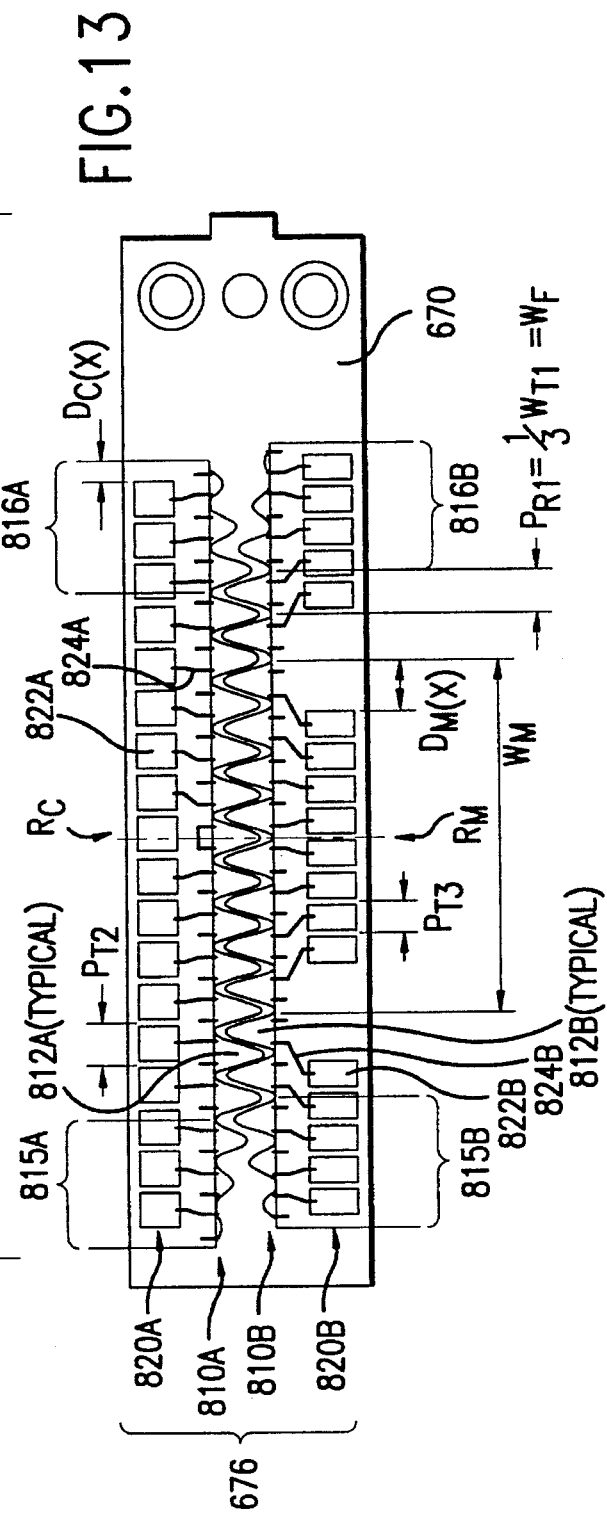
FIG. 13

SEALED MECHANICAL CONFIGURATION FOR ELECTRONIC CALIPERS FOR RELIABLE OPERATION IN CONTAMINATED ENVIRONMENTS

TECHNICAL FIELD

This invention relates to electronic calipers and more particularly, to a mechanical configuration for making such calipers more reliable in the presence of liquid and particulate contaminants which might otherwise impair the performance of the transducers.

BACKGROUND OF THE INVENTION

Electronic calipers are becoming increasingly common in manufacturing industries. Capacitive position transducers are almost universally used as the principle component of electronic calipers for measuring thickness and other physical parameters. These capacitive transducers include a pair of substrates that move relative to each other along a measurement axis. A set of electrodes is carried by each of the substrates, with the electrodes of one substrate being positioned close to the electrodes on the other substrate to form a capacitor therebetween. The electrodes on each of the substrates are connected to conventional circuitry for providing an indication of the relative position between the two substrates as a function of the capacitance between various electrodes in each set. The capacitive position transducer may be of the incremental type, in which the circuitry provides only an indication of incremental movement from a known point, or an absolute position type, in which the circuitry provides an indication of the relative position between the two substrates regardless of whether their initial relative position is known. Incremental and absolute position type position transducers are disclosed in U.S. Pat. No. 4,420,754 and 4,879,508.

Although these calipers are sometimes used in dry, relatively clean, environments, such as inspection rooms or engineering offices, such calipers are often used to measure dimensions of work pieces in machine shops and in other relatively dirty environments. When used in these environments, such calipers can become contaminated by particulate matter and fluids, such as cooling or cutting fluids. The liquid or particulate contaminants find their way between each set of electrodes and affect the capacitance between the electrodes in a manner that is not related to the relative position between the substrates along the measurement axis. Contaminants between the electrodes of a capacitive position transducer degrade performance in two respects. First, the particulate or fluid may be a dielectric having a dielectric constant that is different from the dielectric constant of air that is in an air gap between the sets of electrodes. The capacitance between electrodes on opposite sides of the contaminate will thus be greater than the capacitance between other electrodes having the same relative geometry which do not have contaminants therebetween. Under these circumstances, the capacitance between the electrodes will not provide an accurate indication of the relative position between the substrates.

The second effect of contaminants between electrodes results when the contaminants are resistive. A resistive substance between the electrodes will cause the signal coupled between the electrodes to be differentiated with respect to time. The time constant of the differentiation is a function of both the conductivity of the contaminant and the capacitance between the electrodes. Where the time constant is relatively short, the amplitude of the signal may decay so rapidly that it cannot be sensed by conventional circuitry for capacitive position transducers.

One approach to minimizing the adverse effects of contaminants in capacitive position transducers is described in U.S. Pat. No. 5,172,485 to Gerhard et al. Gerhard et al. teach coating the electrodes of each substrate with a thin layer of dielectric material and then mounting the substrate so that the dielectric material coating the electrodes of one substrate slides along the dielectric material coating the electrodes of the other substrate. In theory, the sliding contact between the dielectric layers eliminates any air gap for contaminants to fill. However, the sliding contact approach described in the Gerhard et al. patent requires that the substrates be resiliently biased toward each other so that deviations from exact surface flatness and alignment can be accommodated by allowing the substrates to move apart. However, the compliant nature of the suspension for the substrates allows the substrates to be forced apart from each other by particulate contaminants which inevitably collect between the electrodes when the capacitive position transducer is used in a dirty environment. Thus, the approach of reducing the gap between electrodes and, in the extreme case, eliminating the gap altogether, has not proven to be adequate under some circumstances.

One approach to isolating a variety of precision devices from liquid and particulate contaminants is to seal sensitive components of the devices from the external environment. However, it has not been thought possible to effectively seal the space between the electrodes of capacitive position transducers used in calipers because the slide containing one set of electrodes must slide across the exposed surface of the scale containing the other set of electrodes. As a result, the space between the two sets of electrodes is inherently exposed to the external environment.

SUMMARY OF THE INVENTION

It is an object of the invention to provide an electronic caliper configuration which enhances the reliability of electronic calipers for harsh industrial environments by isolating the transducer elements from particulate and fluid contaminants.

It is another object of the invention to substantially retain the conventional form, operation, and feel of the caliper despite the features necessary to isolate the transducer elements from contaminants in the surrounding environment.

It is another object of the invention to provide a technique for isolating capacitive electrodes of electronic calipers that can be adapted to a variety of caliper designs in which the active electrodes are mechanically coupled to either the slide or the main beam.

It is still another object of the invention to provide a technique for making a caliper insensitive to environmental contaminants that is economical and does not jeopardize measuring accuracy under normal use conditions.

These and other objects of the invention are provided by a capacitive electronic caliper having a slider mounted on an elongated main beam in a conventional configuration with respective position measuring jaws projecting from the main beam and slider. As a result, the position of the slider on the main beam is indicative of the distance between the first and second position measuring jaws. As in conventional capacitive electrode calipers, the main beam is mechanically coupled to an elongated scale which includes a first set of electrodes extending in a pattern along the length of the scale. However, the scale is enclosed with an elongated enclosure, thereby forming an elongated cavity that also receives a second set of electrodes mounted on a substrate positioned in the cavity so that the substrate can move along the length of the scale. A sealing mechanism isolates the cavity from the external environment. The caliper also includes a coupling mechanism that mechanically couples the slider to the substrate so that the relative movement between the position measuring jaws corresponds to the relative movement between the first and second set of electrodes. The coupling mechanism may include a first bar extending along the main beam and coupling the slider to the substrate. The bar may extend through a small, easily sealed aperture formed in the end wall of the cavity. A portion of a bar that projects from the cavity is mechanically coupled to the slider in one embodiment, and in another embodiment is connected to a second bar that is attached to the slider. In either case, the first bar thus mechanically couples the substrate to the slider so that the relative movement between the first and second sets of electrodes correspond to the relative movement between the scale, main beam, and the slider. Furthermore, one of the bars can be used as a depth bar to measure the depth of a hole formed in a surface. Conventional electronic readout circuitry is connected to either set of electrodes to provide an indication of the relative position between the first and second position measuring members, which coincides with the separation of the caliper jaws and the projection length of the depth bar, as a function of the capacitive coupling between the first and second sets of electrodes. If the readout circuitry is connected to the second set of electrodes, the first (and second) bar are preferably hollow to allow the wires from the readout circuitry to be routed to the second set of electrodes through the first (and second) bar. In the case that the inventive capacitive electronic caliper includes the second coupling bar, then it preferably also includes a third bar extending between the slider and the junction between the first and second bars with the first bar positioned coincident with the neutral bending axis of the composite section of the second and third bars, midway between the second and third bars. This configuration causes the relative position between the first and second sets of electrodes to be relatively insensitive to bending of the bars. Coupling the slider to the second set of electrodes through a bar that moves axially through a single, relatively small aperture allows the contamination sensitive electrode sets to be effectively isolated within the cavity formed in the scale. Although the inventive mechanical configuration is advantageously used a part of an electronic caliper including a capacitive transducer, it may also be used for calipers using other types of transducers.

BRIEF DESCRIPTION OF THE DRAWINGS

FIG. 13 is an enlarged view of the absolute capacitive electrode configuration shown in FIG. 12, showing details of the electrode geometry.

DETAILED DESCRIPTION OF THE INVENTION

Figure 1:
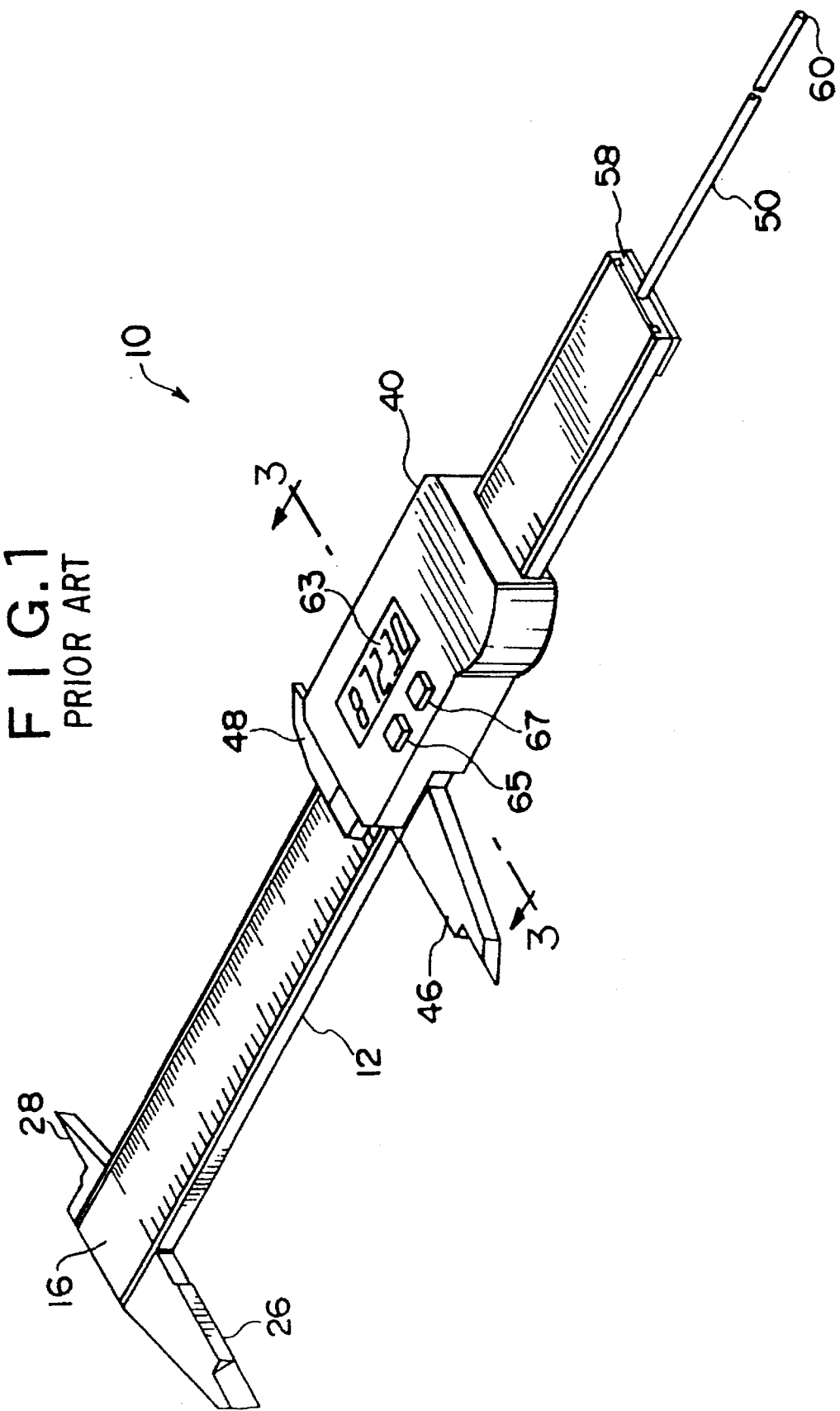
FIG. 1 is an isometric view of a conventional electronic caliper using a capacitive position transducer.

An electronic caliper 10 using a conventional capacitive position transducer is shown in FIG. 1. A main beam 12 is provided with an elongated measuring scale 16 that is rigidly bonded to the main beam 12. The top surface of the scale 16 is very nearly coplanar with the top edges of main beam 12. A slider assembly 40 is slidably mounted on the main beam 12 so that it straddles the main beam 12 and can move along the length of the scale 16. A pair of dimension measuring jaws 26, 28 are formed at the end of the main beam 12. The jaws 26, 28 are used with a pair of dimension measuring jaws 46, 48 formed at the end of the slider assembly 40. The jaw 46 is used with the jaw 26 on the main beam 12 to measure the outer dimension of objects, while the jaw 48 is used with the jaw 28 on the main beam 12 to measure the inner dimension of objects. When the outer dimension measuring jaws 26, 46 are contacting each other, the measuring edges of the inner dimension measuring jaws 28, 48 are also coplanar with each other, and the caliper 10 is conventionally set to measure zero at that time.

The caliper 10 also includes a depth bar 50 which is attached to, and projects from, the slider assembly 40 along the length of the main beam 12. The depth bar 50 has a length selected so that its projecting end 60 is flush with an end 58 of the main beam 12 when the caliper 10 measures zero. By resting the end 58 of the main beam 12 on a surface and extending depth bar 50 into a hole formed in the surface until projecting end 60 touches the bottom of the hole, the caliper 10 is able to measure the depth of the hole.

Regardless of whether a measurement is made using the outside measuring jaws 26, 46, the inside measuring jaws 28, 48, or the depth bar 50, the measured dimension is displayed on a conventional digital display 63. A pair of push button switches 65, 67 is used to turn electronic circuitry (not shown) in the slider assembly 40 on and off, and to reset the display 63 to zero, respectively.

The structural details of the electronic caliper 10 are best described with reference to FIGS. 2 and 3.

The slider assembly 40 includes a slider member 49 that has a guiding edge 42 configured so that, when the slider assembly 40 straddles the main beam 12, the inner surface of the guiding edge 42 contacts a mating side edge of the main beam 12 to ensure accurate operation of the caliper. Conventional manual adjustment mechanisms 41 and a pressure bar 43 may be used to precisely adjust the distance between the inner surface of the guiding edge 42 and the pressure bar 43 to match the width of the main beam 12 so that there is no free play between the slider assembly 40 and the main beam 12.

Figure 2:
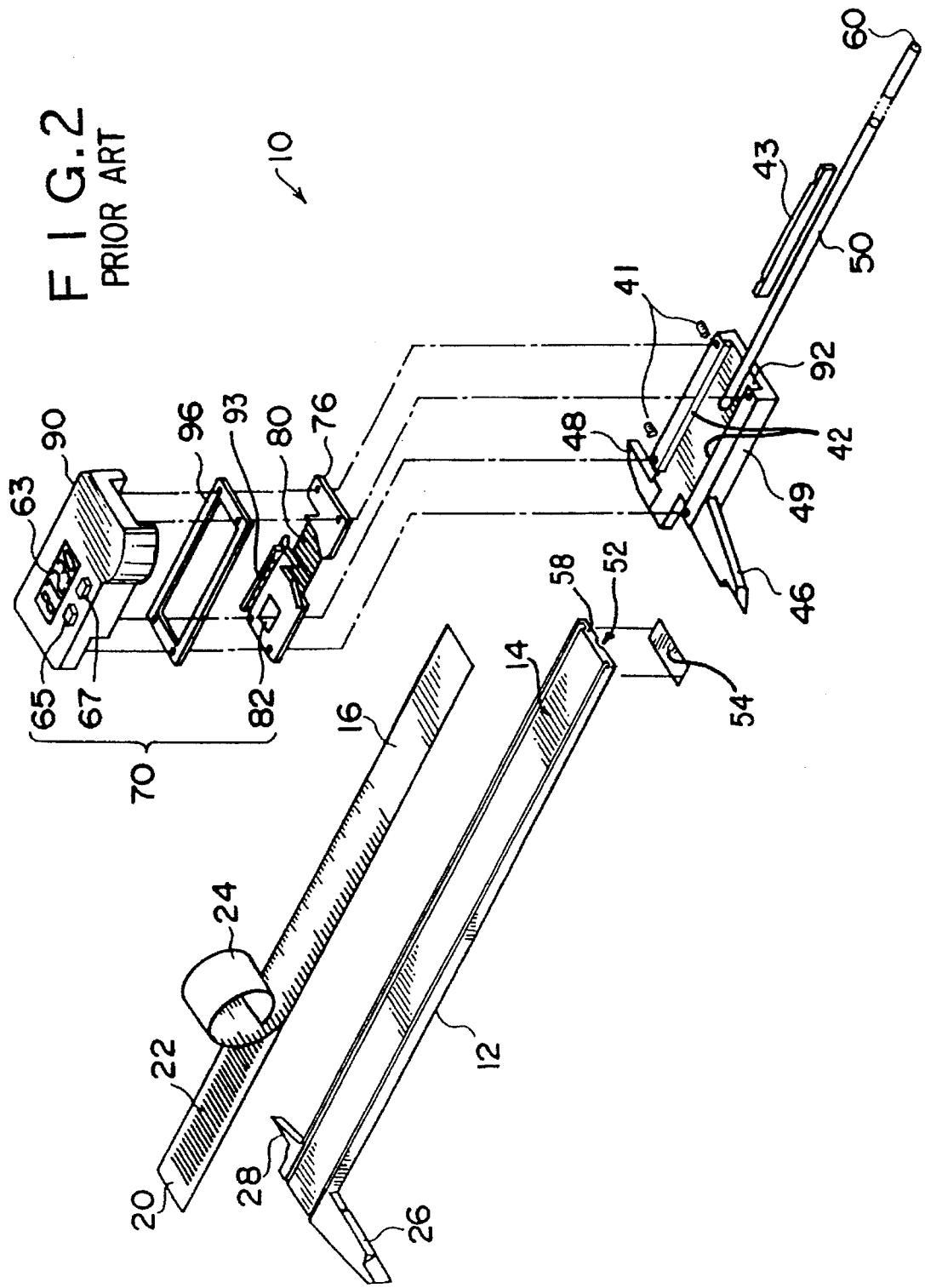
FIG. 2 is an exploded isometric view of the conventional electronic caliper shown in FIG. 1.
Figure 3:
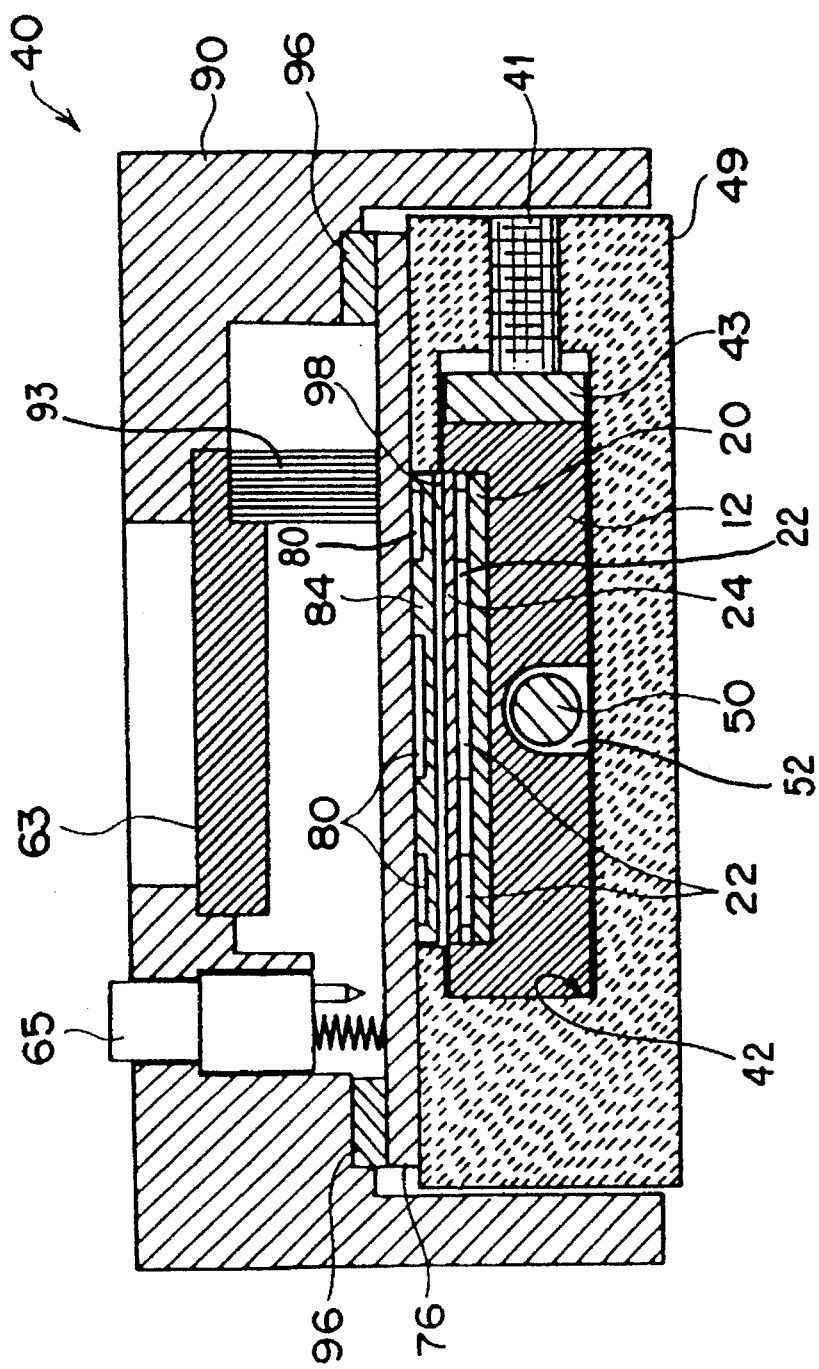
FIG. 3 is a schematic cross-sectional view of the conventional electronic caliper shown in FIG. 1 taken along the line 3—3 of FIG. 1.

As also shown in FIGS. 2 and 3, the depth bar 50 is received by a depth bar groove 52 extending along the length of the underside of the main beam 12 to provide clearance for the depth bar 50. The depth bar 50 is retained in the depth bar groove 52 by an end stop 54 fastened to the underside of the main beam 12 near the end 58. The end stop 54 also prevents the slider assembly 40 from inadvertently coming off the end of main beam 12 during operation. As mentioned above, the depth bar 50 has a length selected so that its projecting end 60 is flush with the end 58 of the main beam 12 when the caliper measures zero.

The slider assembly 40 also includes a pickoff assembly 70 mounted on the slider member 49 above the upper surface of the main beam 12 so that the slider member 49 and pickoff assembly 70 move with each other as a unit. The pickoff assembly 70 includes a substrate 76, such as a conventional printed circuit board. The substrate 76 has a second set of capacitive electrodes 80 formed on its lower surface (shown schematically in cutaway view), and electronic measuring and display circuitry 82 (FIG. 2) mounted on its upper surface. If desired, the second set of electrodes 80 may be covered with a thin insulative coating 84 (FIG. 3).

The substrate 76 is enclosed by a cover 90 which typically includes the switches 65, 67 and the display 63. Typically, a resilient seal 96 is compressed between the cover 90 and substrate 76 in a sandwich construction by standard fastening techniques (not shown). The pickoff assembly 70 is then rigidly attached to the slider member 49 by standard fastening techniques (not shown). The electronic measuring and display circuitry 82 is connected to the second set of electrodes 80, the switches 65, 67 and the display 63 in a conventional mariner which, in the interests of brevity, will not be explained in detail. Briefly, however, circuitry 82 applies a signal to some of the second set of electrodes 80 which is capacitively coupled to the first set of electrodes 22. The signal is then capacitively coupled back from the first set of electrodes 22 to some of the second set of electrodes 80, and is applied to the circuitry 82. The manner in which the phase or amplitude of the signals is altered after being capacitively coupled between the first and second set of electrodes 22, 80, respectively, provides an indication of the position of the first set of electrodes 22 relative to the second set of electrodes 80, and hence the position of the slider assembly 40 relative to the scale 16. The circuitry 82 then drives the display 63 to provide a digital readout of the measurement being made by the caliper 10. Connection between electronics 82 and display 63 is typically by conventional elastomeric connector 93 (FIG. 3).

As also shown in FIGS. 2 and 3, the scale 16 is received in a recess 14 formed in the main beam 12. The depth of the recess 14 and the thickness of the scale 16 are substantially identical so that, as mentioned above, the top surface of the scale 16 is substantially coplanar with the top edges of the main beam 12.

The scale 16 includes an elongated substrate 20 mounted in the recess 14. A first set of electrodes 22 arranged in an elongated pattern is mounted on the substrate 20. A protective insulating cover 24, which may include printed markings, overlies the first set of electrodes 22.

It will be apparent from FIG. 3 that an air gap 98 is formed between the insulate coating 84 that covers the second set of electrodes 80 and the insulating cover 24 that covers the first set of electrodes 22. This air gap 98 has created a long-standing problem of contamination sensitivity because there is an appreciable volume in the air gap 98 for both liquid and particulate contaminants to collect. Such contaminants have a dielectric constant that is significantly greater than the dielectric constant of air (i.e., 1). Since the contaminants normally fill the gap 98 in an uneven or non-symmetrical manner, the coupling between the first and second set of electrodes 22, 80 is significantly and erroneously affected by the pattern with which the contaminants fill the gap 98, rather than solely and properly by the longitudinal position of the sets of electrodes 22, 80 relative to each other. Under these circumstances, the caliper 10 cannot provide accurate measurements. Also, in the event that the contaminants are resistive, the square wave signals that are generally transmitted across the gap 98 by one set of electrodes 22 or 80 have a rapidly decreasing amplitude as they are received by the other set of electrodes 80 or 22. The rate of decay of the square wave is a function of the time constant of the capacitance between the sets of electrodes 22, 80 and the resistance of the contaminants in the air gap 98. For relatively low resistance contaminants, such as conductive fluids or metal particles, the time constant may be very short, thus causing the coupled square wave to decay too quickly to be measured by an economically practical electronic measuring and display circuitry 82.

The problem of contaminants in the air gap 98 between the sets of electrodes 22, 80 has been recognized. Attempts have been made to prevent the contaminants from finding their way into the gap 98 by using sliding seals between the substrate 76 and the scale 16. Attempts have also been made to solve this problem by reducing the size of the gap 98, thereby theoretically reducing the amount of contaminants that can be contained in the gap 98. Attempts have even been made to minimize the contamination problem by allowing the first set of electrodes 22 to slide on the second set of electrodes 80 through a thin dielectric coating, thereby attempting to eliminate the air gap 98 altogether. These solutions have not provided the desired reliability for the conventional caliper configuration because contaminants invariably enter the gap 98. The size and sliding nature of the opening into the gap 98 make it impossible for a sliding seal to keep contaminants out of the gap 98 indefinitely. Particulate contaminants either exert forces in the gap 98, thereby opening it wider and allowing a thicker contamination layer to affect the measurements, or in some cases, particulate contaminants become wedged in the gap 98, thereby causing unacceptable drag or abrasion between the second set of electrodes 80 and the scale 16.

Attempts could be made to keep contaminants out of a gap between the first and second sets of electrodes 22, 80 by some other means. However, it has not seemed possible to do so because of the constraints inherent in the basic structure of conventional capacitive electrode calipers. Specifically, the first set of electrodes 22 must extend along the scale 16 which extends along the main beam 12, and the slider assembly 40 with pickoff assembly 70 that carries the second set of electrodes 80 must slide along the outside of the scale 16 with the first and second set of electrodes 22, 80 positioned adjacent each other. This structure inherently forms an externally accessible air gap that actually shifts location along the length of the main beam 12 and scale 16 as the slider assembly 40 moves. Attempts might even be made to somehow place the first and second set of electrodes 22, 80 in a common enclosure so that the gap therebetween is isolated from external contaminants. However, it has not been considered possible to do so because the slider assembly 40 containing the second set of electrodes 80 must be externally accessible for contacting the workpiece, thus precluding it from being placed in an enclosure.

It might be possible to radically redesign capacitive electrode calipers so that the slider assembly was externally accessible but the electrode gap was enclosed. However, a radical redesign of this nature would seem to require alteration of the basic structure of the caliper, thus giving it a form, operation, feel, and higher cost that is different from the accepted form, operation, and feel and cost of a conventional caliper.

For all of the above-described reasons, it generally has not been considered possible to isolate from environmental contaminants the air gap 98 of a caliper having the basic structure, operation, and feel of a conventional caliper. This impossibility of effectively preventing particulate and liquid contaminants from entering the gap 98 between the two sets of electrodes 22, 80 has proven to be a severe limitation on the utility of electronic calipers in the typical industrial shop environment.

Figure 4:
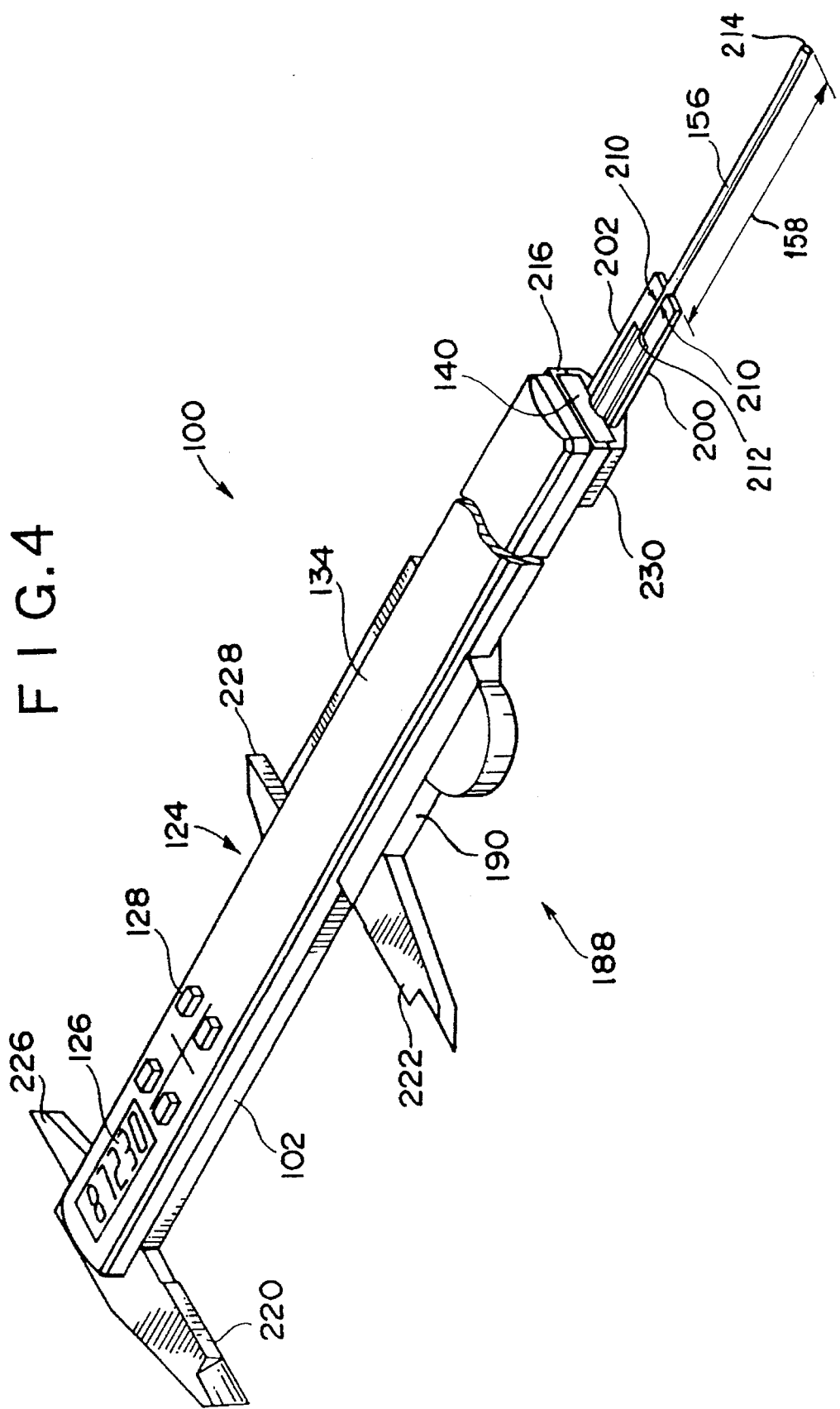
FIG. 4 is an isometric view of one embodiment of the inventive electronic caliper.

However, one solution that solves this long-standing contamination problem in a caliper having the basic structure, operation, and feel of a conventional caliper is shown in FIG. 4. With reference to FIG. 4, one embodiment of the inventive caliper 100 includes a main beam 102 of conventional configuration.

An electronic assembly 124 is mounted on the upper surface of the main beam 102 by conventional fastening and adhesive sealing techniques. The external electronic assembly 124 is a conventional electronic display assembly including a sealed LCD display window 126, sealed switches 128, and printed circuit substrate with conventional transducer signal processing and display electronics 130 (not shown), all of which are enclosed in a housing 134. Power may be provided by conventional watch batteries or solar cells (not shown) mounted inside the housing 134. The housing 134 is fastened to the main beam 102 by conventional fasteners and seals or adhesives such that the external electronic assembly 124 is completely protected by a watertight seal everywhere on their periphery.

An elongated rectangular enclosure 140 having an elongated rectangular cavity (not shown) is secured to the underside of the main beam 102. The main beam has formed therein downwardly extending sidewalls that straddle the cavity enclosure 140 so that only the end of the enclosure 140 is visible in FIG. 4.

The final major component of the caliper 100 is a slider assembly 188. The slider assembly 188 includes a slider 190 that is configured so that it slides along the main beam 102. The slider 190 is formed to provide clearance for all outer walls of the cavity cover 140. A first pair of measuring jaws 220, 226 is integrally formed with the main beam 102. A second pair of measuring jaws 222, 228 is attached to the slider 190. The outside dimension of an object is measured by placing the object between the jaws 220, 222. The inside dimension of an object is measured by placing the jaws 226, 228 inside the object.

The slider assembly 188 also includes linkage bars 200, 202 that are attached through spacer block portions 210 to an attachment location 212 on the depth bar 156. When the jaw surfaces 220, 222 or 226, 228 are aligned with each other, the end 214 of the depth bar 156 is flush with the end 216 of the main beam 102 to correspond to zero depth, as in a conventional caliper with depth bar. The spacer blocks 210 are preferably welded to the linkage bars 200, 202 and to the depth bar 156, but adhesive fastening, miniature conventional fasteners, or a suitable clamping system may also be used. By resting the end 216 of the main beam 102 on a surface and extending depth bar 156 down into a hole, the hole depth can be measured by the caliper 100. Since the attachment location 212 is spaced a considerable distance from the end 214 of the depth bar 156, the depth bar 156 is free from the surrounding linkage bars 200, 202 over a considerable length, thus allowing the caliper 100 to measure the same relatively small, shallow holes that can be measured with traditional calipers. However, it is desirable to position the linkage bars 200, 202 as close together as possible so that when the depth bar 156 is in use, the linkage bars 200, 202 may extend into the smallest diameter hole possible, thus increasing the utility of the caliper 10 for measuring narrow holes that are deeper than the distance from the end 214 of the depth bar 156 to the attachment location 212.

Figure 5:
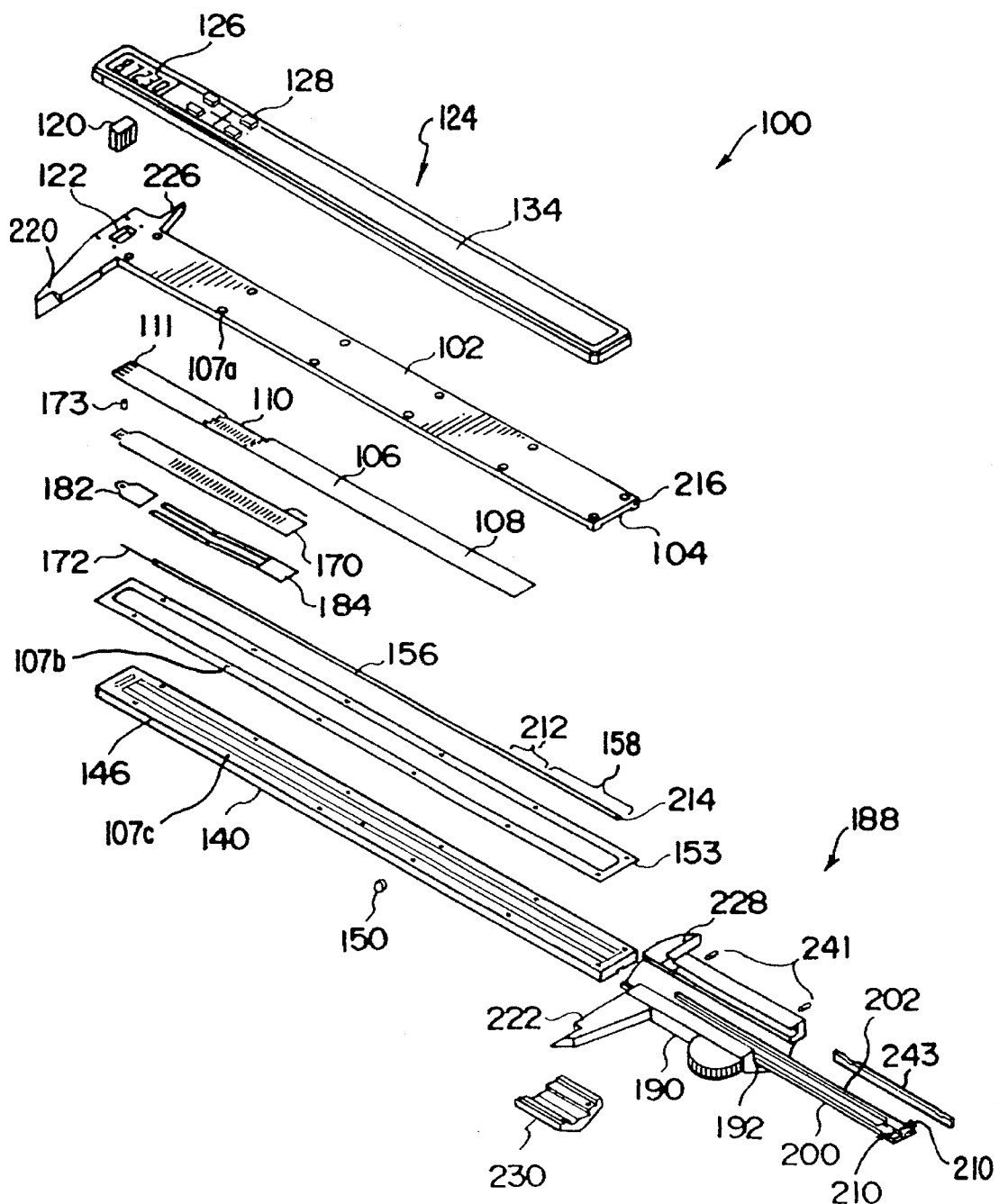
FIG. 5 is an exploded isometric view of the embodiment of the inventive electronic caliper shown in FIG. 4, using a capacitive position transducer.

The internal structure of the caliper 100 of FIG. 4 is best shown in FIG. 5. The main beam 102 is provided with an elongated recess 104 on its lower surface. A capacitive measuring scale 106 is formed by an insulating substrate 108, which may be a printed circuit board, with a first set of electrodes 110 forming a pattern extending along the underside of the substrate 108. The measuring scale 106 is rigidly bonded into the recess 104 such that the bottom surface containing the first set of electrodes 110 faces downwardly as illustrated in FIG. 5.

The measuring scale 106 may be formed by a conventional printed circuit board having through-holes extending from the bottom surface containing the first set of electrodes 110 to the upper surface. Circuit traces 111 can then be formed on the upper surface of the scale 106 so that connections may be conveniently made to a conventional elastomeric connector 120. The connector 120 extends through an aperture 122 in the main beam 102 to mate with a circuit connector pad (not shown) projecting downwardly from the external electronic assembly 124 when the assembly 124 is mounted on the upper surface of the main beam 102.

As mentioned above, the elongated rectangular enclosure 140 has formed therein a cavity 142 that is sealed against the recess 104 in the underside of the main beam 102 thereby forming a sealed and enclosed cavity 142. The enclosure 140 is preferably secured to the main beam 102 solely with an adhesive such that the cavity 142 is isolated by a watertight seal completely around its periphery. Alternatively, the enclosure 140 may be joined to the main beam 102 by conventional miniature fasteners (not shown) and sealed with a gasket 153 or sealant (not shown).

Figure 6:
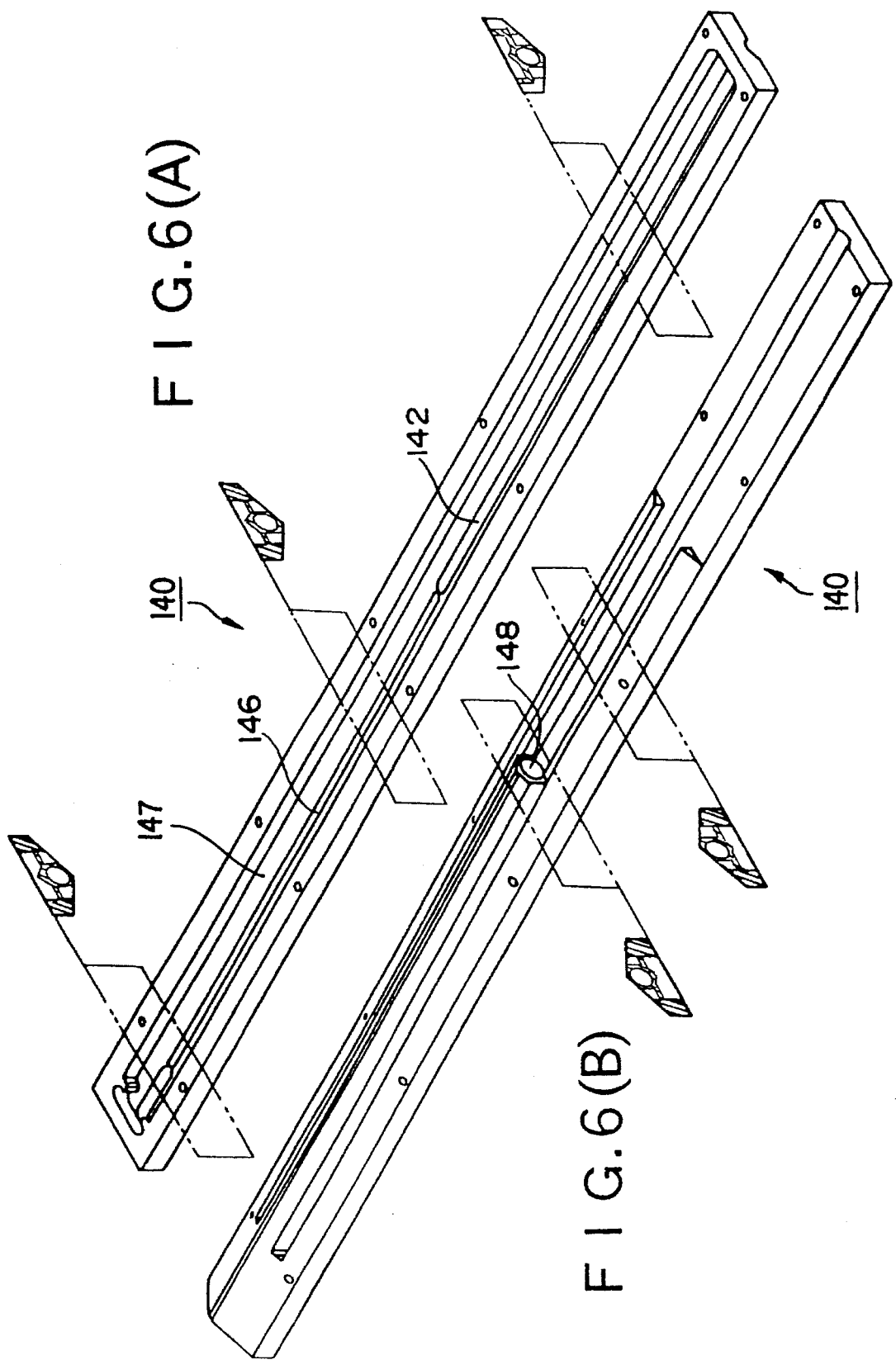
FIGS. 6A and 6B are top and bottom isometric views, including cross-sectional views at various locations of a key component forming the elongated cavity of the inventive electronic caliper shown in FIG. 4 and FIG. 5.

The enclosure 140 (best shown in FIG. 6) is provided with an elongated internal groove 146 and a through-hole 148 located at the end of the groove 146 which is nearest the end 216 of the main beam 102. The throughhole 148 is configured to accept permanent insertion of a conventional low friction miniature lip seal 150. The miniature lip seal 150 is cylindrical, and has a hole diameter chosen to complement the diameter of a depth bar 156 such that a low-friction water-tight and particle-tight seal is formed between the seal 150 and depth bar 156. The depth bar 156 is inserted through lip seal 150 so that it can slide lengthwise in the internal groove 146. The end of the depth bar 156 inside the cavity 142 is joined to the substrate coupling block 182 via a single-degree- of-stiffness flexure 172, which is stiff in the axial direction. The coupling block 182 is rigidly joined to the substrate 170, for example with a set screw 173 and adhesive. The substrate 170, which may be printed circuit board, carries a second set of electrodes 176 arranged in a pattern extending along the length of the substrate 170 on its upper surface. The second set of electrodes 176 on the substrate 170 interacts with the first set of electrodes 110 on the substrate 108 in a conventional manner to provide an indication of the position of the substrate 170 along the length of the substrate 108.

In the case where the inventive caliper 100 is to utilize the conventional incremental-type capacitive electrodes (which currently predominate in the market), the inventive caliper is able to use the same electronic circuitry and incremental type electrode configurations as described in U.S. Pat. Nos. 4,420,754, 4,878,013, and 4,959,615 with the active electrodes repeated in a relatively longer configuration and the passive electrodes repeated fewer times in a relatively shorter configuration, according to the present invention.

In the case where the inventive caliper is to duplicate the function of the newer absolute-type capacitive electrode calipers according to U.S. Pat. No. 5,023,559 (which are now entering the market), the inventive caliper may use the circuitry of U.S. Pat. Nos. 4,879,508 or 5,023,559.

The substrate 170 may be actuated from outside the cavity 142 by moving the depth bar 156 axially through the lip seal 150. Either or both sets of electrodes 110, 176 may be coated with a thin layer of material (not shown) to provide electrical insulation, reduce friction, and provide a sliding wear surface. It is preferred that any coating on electrodes 110, 176 be chosen in accordance with the teachings of co-pending U.S. patent application Ser. No. 08/122,909, entitled "Dielectric Coating For Capacitive Position Transducers To Reduce Sensitivity To Contaminants", now U.S. Pat No. 5,416,424, which is incorporated herein by reference. A layer of material or a suitable molded piece (not shown) may be added to an edge of substrate 170, to reduce friction and enhance the wear characteristics at the sliding interface between the edge of the substrate 170 and the side of the cavity 142.

The flexure 172 is positioned so that, following assembly and installation it is in a nominally straight configuration. The flexure 172 provides two functions in the preferred embodiment: First, since it is stiff axially and compliant in other directions, it can actuate the substrate 170 along the length of the scale 106 with a high degree of accuracy. Secondly, the flexure 172 can accommodate misalignments of the depth bar 156, the cavity 142 and the substrate 170 without inducing high stresses. A preload spring 184 is bonded to the substrate 170, and, when assembled and compressed against a surface 147 (FIG. 6) in the cavity 142, it resiliently biases the substrate 170 against the lower surface of the substrate 108 as it slides along the scale 106, which allows the present invention to apply the teachings of co-pending, commonly assigned U.S. patent application Ser. No. 08/122,909, entitled "Dielectric Coating For Capacitive Position Transducers To Reduce Sensitivity To Contaminants", now U.S. Pat No. 5,416,424, most advantageously. At the same time, the edges of the substrate 170 are in sliding contact with bearing surfaces on the sides of the cavity 142. Thus, the flexure 172 allows the substrate 170 to be guided by the lower surface of the measuring scale 106 on its upper side and by a side of the cavity 142 on its sides. The substrate 170 is thus constrained in two axes to insure that both sets of electrodes 110, 176 are maintained in proper alignment as the substrate 170 moves along the scale 106. The flexure 172 may be inserted and bonded into an axial hole in the end of the depth bar 156 and likewise into a hole in substrate coupling block 182. Block 182 may also have a portion which acts as a sliding bearing when it reacts against the surfaces of the internal groove 146 under the spring forces of the flexure 172, preload spring 184, and forces induced by any misalignment of the depth bar 156.

As mentioned above, the slider assembly 188 includes a slider 190. The slider 190 is configured so that it slides along the main beam 102 with its guide edge 192 contacting the mating side edge of the main beam 102, as required for accurate operation of the caliper 100. Conventional manual adjustment mechanisms 241 and pressure bar 243 may be used to adjust the distance between the slider guide edge 192 and the pressure bar 243 so that they exactly match the width of the main beam 102. The slider 190 is formed to provide clearance for all outer walls of the cavity enclosure 140. As mentioned above, the slider assembly 188 also includes linkage bars 200 and 202, located outside the cavity enclosure 140. The linkage bars 200, 202 are parallel and adjacent to the outer walls of internal groove 146, and preferably positioned as close as possible to the outer walls of internal groove 146 and the bottom of the enclosure 140 while still maintaining enough clearance to so that they do not contact the outer walls or the enclosure bottom and induce unwanted frictional drag during caliper operation.

It is desirable to position the linkage bars 200, 202 as close together as possible so that when the depth bar 156 is in use, the linkage bars 200, 202 may extend into the smallest diameter hole possible, thus increasing the utility of the caliper 10 for measuring narrow holes that are deeper than the distance from the end 214 of the depth bar 156 to the attachment location 212.

Figure 8:
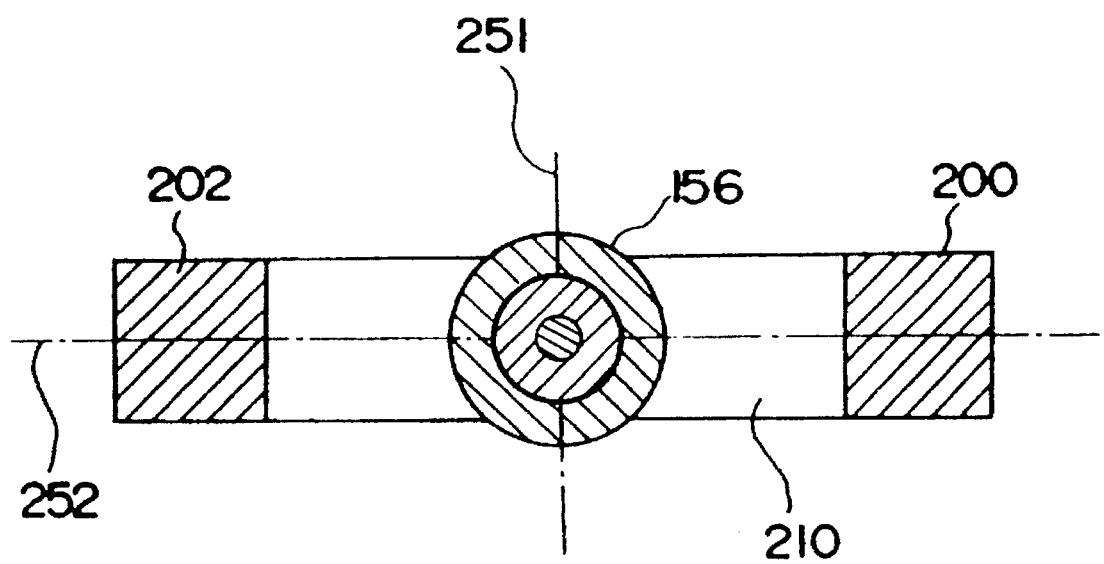
FIG. 8 is a cross-sectional view of the assembled linkage bars and depth bar shown in FIGS. 4 and 5.

The neutral bending axis of the depth bar 156 is preferably positioned to coincide with the neutral bending axis of the composite cross-section of the linkage bars 200, 202, as illustrated in FIG. 8. In the present embodiment, the composite cross-sections of the linkage bars 200, 202 is symmetric in the two primary bending axes, and the depth bar 156 cross-section is circular so the center of the depth bar 156 is positioned to coincide with the intersection of a plane 251 midway between the linkage bars 200, 202 and the plane 252 joining the centers of the individual linkage bars 200, 202. This configuration causes the accuracy of caliper 100 to be relatively insensitive to bending of the linkage bars 200, 220 and depth bar 156 in any direction. If the depth bar 156 did not coincide with the composite neutral axis of the linkage bars 200, 202, then bending of the linkage bars 200, 220 and depth bar 156 would effectively cause an axial displacement of the depth bar 156 which is unrelated to the motion of the slider 190, thus producing a measurement error. To those skilled in the art, it will be apparent that in some configurations in which the neutral axes of the depth bar 156 and the linkage bar(s) 200, 202 do not coincide, bending error effects such as the above described effect may be more easily analyzed as a type of "Abbe error".

As in the traditional caliper 10 of FIGS. 1–3, an end stop 230 (FIG. 5) is rigidly fastened to main beam 102 near end 216 to prevent the slider 190 from inadvertently coming off the end of main beam 102 during operation. The end stop 230 also tends to insure accurate alignment of the depth bar 156 and the linkage bars 200, 202 and protects them from inadvertent damage by restraining them in their proper tracks near main beam 102 and cavity enclosure 140.

FIG. 6A is a top isometric view of the cavity enclosure 140, clearly showing the elongated cavity 142 and the groove 146. FIG. 6B is a bottom isometric view of the cavity enclosure 140 clearly showing the location of through-hole 148 (which receives seal 150), and the external grooves which provide clearance for linkage bars 200 and 202. FIGS. 6A and 6B also show the cross section of the cavity enclosure 140 at various locations.

Figure 7:
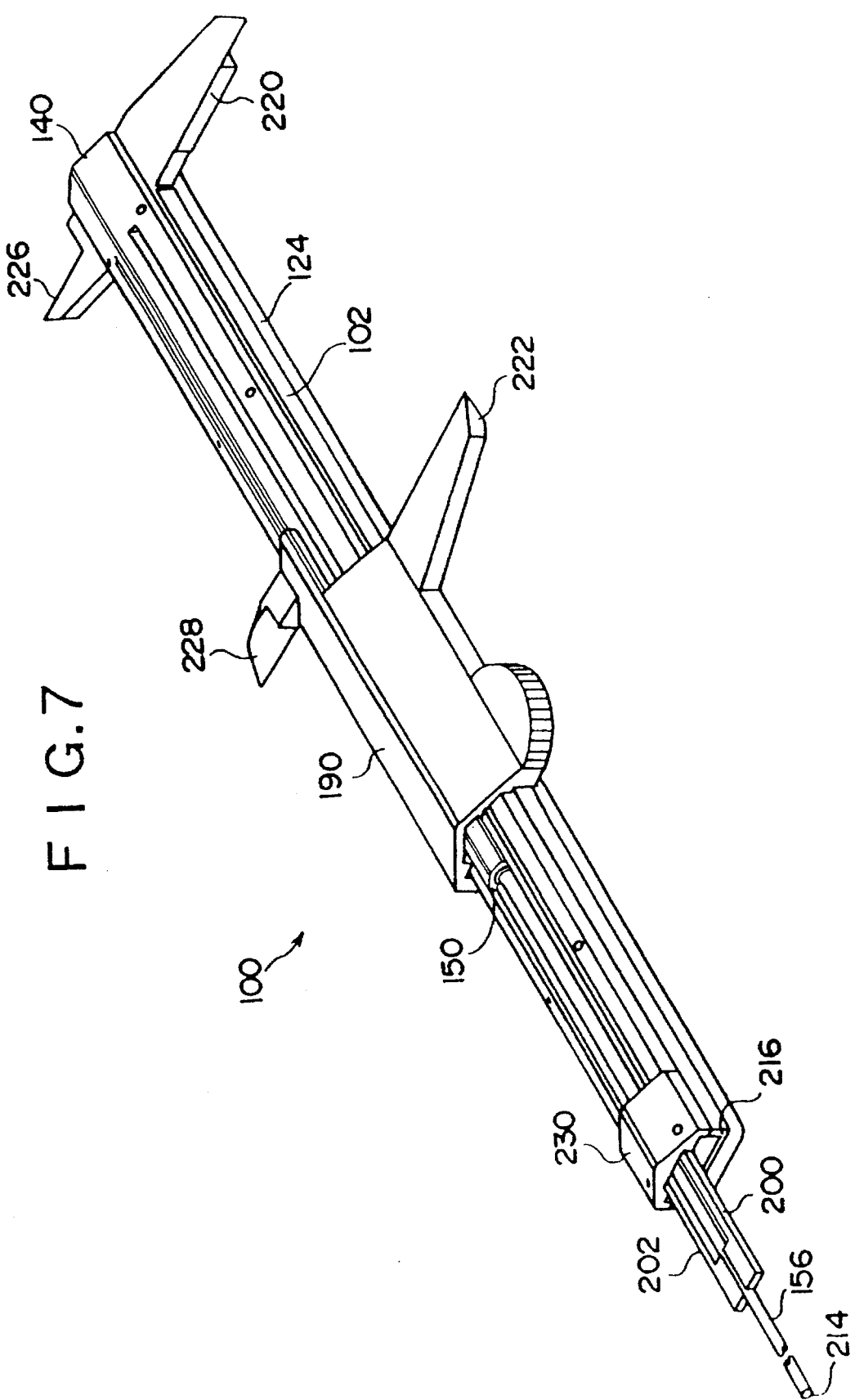
FIG. 7 is an isometric back view to clarify the assembly and operation of the inventive electronic caliper shown in FIGS. 4 and 5.

FIG. 7 shows an isometric view of the backside of the assembled inventive caliper 100, with jaws open. The assembled configuration and operating capability of inventive caliper 100 are thus shown.

Figure 9:
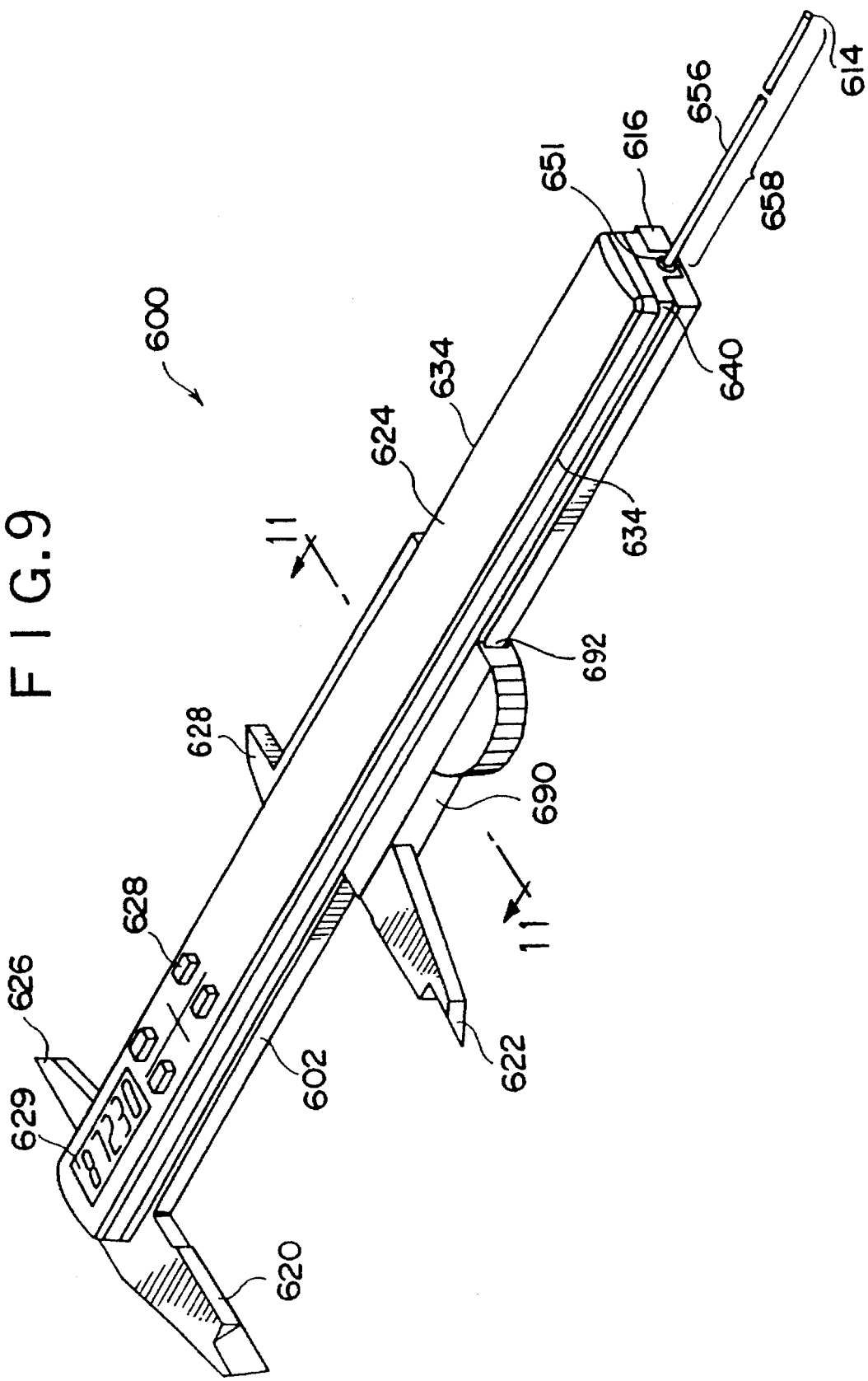
FIG. 9 is an isometric view of a preferred embodiment of the inventive electronic caliper.
Figure 10:
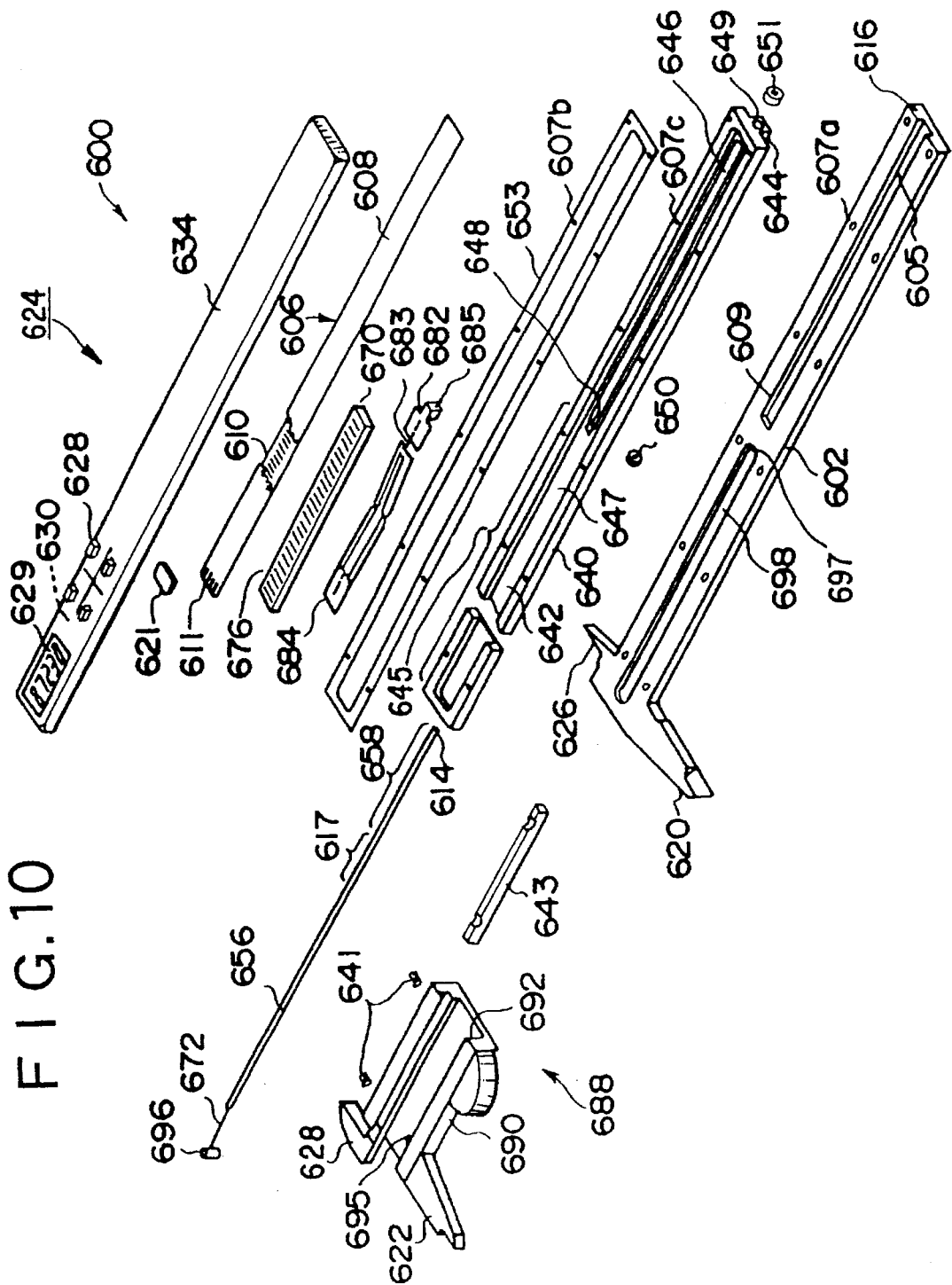
FIG. 10 is an exploded isometric view of the preferred embodiment of the inventive electronic caliper shown in FIG. 9, using a capacitive position transducer.
Figure 11:
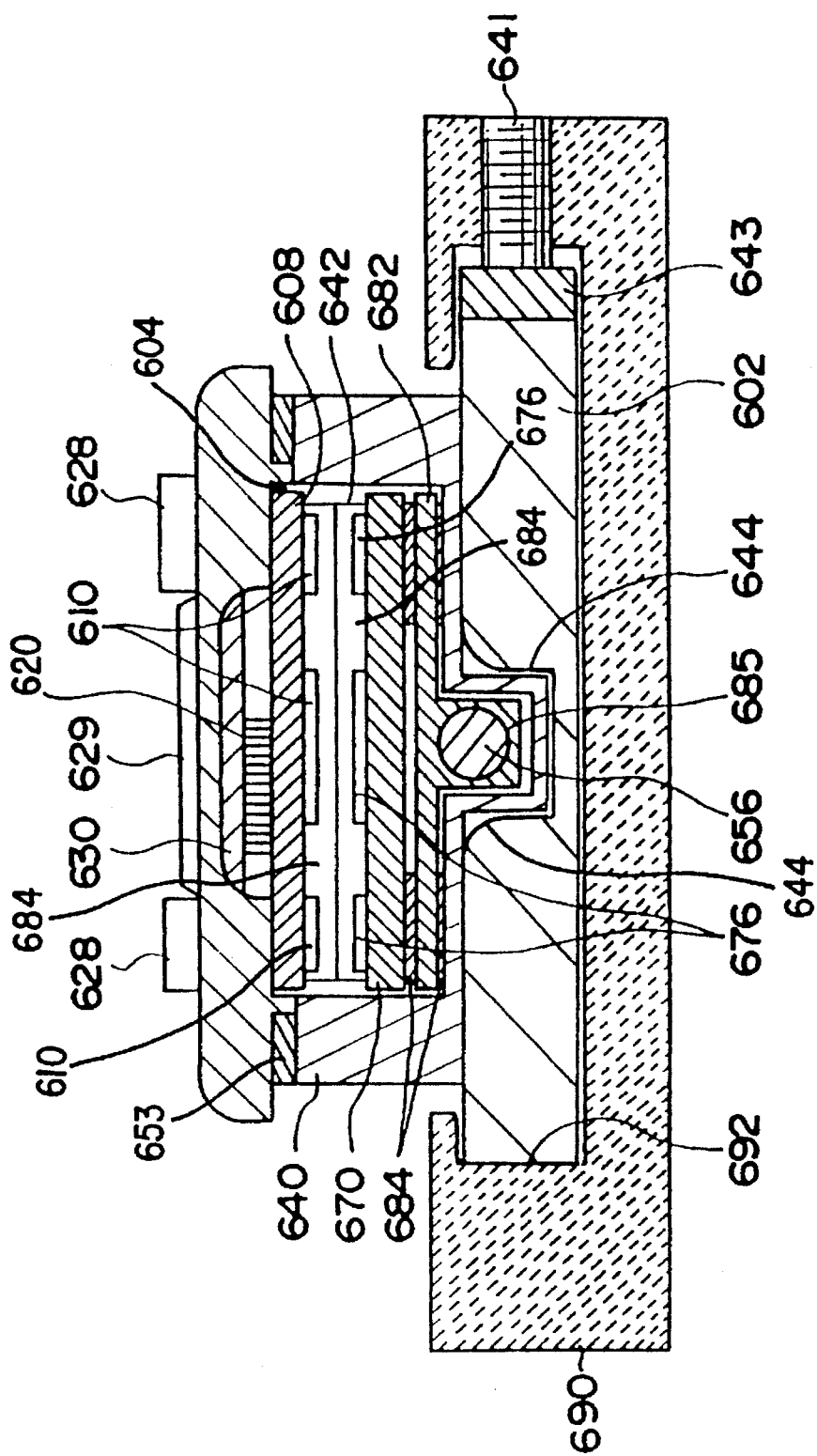
FIG. 11 is a schematic cross-sectional view of the preferred embodiment of the inventive electronic caliper shown in FIGS. 9 and 10, taken along the line 11—11 of FIG. 9.

As another configuration to solve the long-standing problem of contamination sensitivity in an electronic caliper having the basic structure, operation, and feel of a conventional caliper, the presently preferred embodiment of the present invention is shown in FIGS. 9, 10, and 11. With reference to FIGS. 9 and 10, the preferred embodiment of the inventive caliper 600 includes a main beam 602 of conventional configuration, which is provided with an elongated recess 605 along approximately half the length of its upper surface and an elongated slot 698 completely through beam 602 along most of the remaining length, as shown. Axial through-hole 609 is provided in the wall separating the end 697 of slot 698 from the end of recess 605. The diameter of hole 609 is sufficient to provide ample clearance for a coupling bar 656. The width of slot 698 is sufficient to provide ample clearance for an anchor pin 696. The length and position of the slot 698 is chosen to allow the jaw surfaces 622 and 620 to meet when the caliper is at zero (closed) position, and to provide a range of travel for anchor pin 696 which coincides with the desired measuring range for the caliper 600. The slot end 697 together with anchor pin 696 provides the travel-limiting function normally provided by a separate end stop piece in conventional calipers. A capacitive measuring scale 606, is formed by an insulating substrate 608, with a first set of electrodes 610 forming a pattern extending along the underside of the substrate 608 (shown schematically in a partial cutaway view in FIG. 10). The measuring scale 606 may be formed by a conventional printed circuit board having through-holes extending from the bottom surface containing the first set of electrodes 610 to the upper surface. Circuit traces 611 can then be formed on the upper surface of the scale 606 so that circuit connections may be conveniently made through a conventional elastomeric connector 620. The connector 620 may be positioned to be compressed between circuit traces 611 and circuit connector pads (not shown) projecting downwardly from a 2-sided circuit board 630 (partially shown in cutaway in FIG. 10) which is part of electronic assembly 624, thereby achieving all required electrical connections when the measuring scale 606 is compressed against housing 634 and bonded in place. The measuring scale 606 is rigidly bonded into recess 604 (best seen in FIG. 11) on the underside of housing 634, such that the bottom surface containing the first set of electrodes 610 faces downwardly as illustrated in FIGS. 9, 10 and 11. The length of measuring scale 606 is chosen to provide the desired measuring range, as in a conventional caliper.

The substrate 670, which may be printed circuit board, carries a second set of electrodes 676 arranged in a pattern extending along the length of the substrate 670 on its upper surface. The second set of electrodes 676 on the substrate 670 interacts with the first set of electrodes 610 on the substrate 608 in a conventional manner to provide an indication of the position of the substrate 670 along the length of the substrate 608. The substrate 670 may be actuated from outside the cavity 642 by moving the coupling bar 656 axially through the lip seal 650, according to the assembled configuration described below.

Like inventive caliper 100, in the case where the inventive caliper 600 is to utilize conventional incremental-type capacitive electrodes (which currently predominate in the market), the inventive caliper is able to use the same electronic circuitry and incremental type electrode configurations as described in U.S. Pat. Nos. 4,420,754, 4,878,013, and 4,959,615 with the active electrodes repeated in a relatively longer configuration and the passive electrodes repeated fewer times in a relatively shorter configuration, according to the present invention.

In the case where the inventive caliper is to duplicate the function of the newer absolute-type capacitive electrode calipers according to U.S. Pat. No. 5,023,559 (which are now entering the market), the inventive caliper may use the circuitry of U.S. Pat. Nos. 4,879,508 or 5,023,559.

Either or both sets of electrodes 610, 676 may be coated with a thin layer of material (not shown) to provide electrical insulation, reduce friction, and provide a sliding wear surface. It is preferred that any coating on electrodes 610, 676 be chosen in accordance with the teachings of co-pending U.S. patent application Ser. No. 08/122,909, entitled "Dielectric Coating For Capacitive Position Transducers To Reduce Sensitivity To Contaminants," now U.S. Pat. No. 5,416,424. A layer of material or a suitable molded piece (not shown) may be added to an edge of substrate 670, to reduce friction and enhance the wear characteristics at the sliding interface between the edge of the substrate 670 and the side of the cavity 642.

The electronic assembly 624 is a conventional electronic display assembly including a sealed LCD display window 626, sealed switches 628, and printed circuit substrate with conventional transducer signal processing and display electronics 630, all of which are assembled into a housing 634. Power may be provided by conventional watch batteries or solar cells (not shown) mounted inside the housing 634.

An elongated rectangular enclosure body 640 is provided with a recessed cavity 642 over most of its length, as shown. The cavity 642 width and length are chosen to accommodate the width of substrate 670 (which slides along its length), and the length and width of measuring scale 606 which may be conveniently designed to extend into cavity 642 (as best shown in FIG. 11). The cavity 642 depth is chosen to provide clearance for the thickness of substrate 670 and its attached preload spring 684, so that they may slide freely along the length of cavity 642 during operation.

The cavity enclosure 640 is additionally provided with an elongated internal groove 646 and a through-holes 648 and 649 located at the ends of the groove 646. The through-holes 648 and 649 are configured to accept permanent insertion of a conventional low-friction miniature lip seals 650 and 651. The miniature lip seals 650 and 651 are cylindrical, and each has a hole diameter chosen to complement the diameter of a coupling bar 656 such that a low-friction water-tight and particle-tight seal is formed between the seals 650, 651 and coupling bar 656.

Coupling block 682 is attached to a preload spring 684 (a conventional leaf-spring type configuration) via a single-degree-of-stiffness coupling flexure 683, which is stiff in the axial direction. The coupling flexure 683 is positioned so that, following assembly and installation it is in a nominally straight and axially aligned configuration. The coupling flexure 683 provides two functions in the preferred embodiment: First, since it is stiff axially and compliant in other directions, it can actuate substrate 670 (via rigidly attached preload spring 684) along the length of the scale 606 with a high degree of accuracy. Secondly, coupling flexure 683 can accommodate misalignments of the coupling bar 656, the cavity 642, the groove 646, and the substrate 670 without inducing high stresses. The coupling flexure 683 may be attached to both the preload spring 684 and the coupling block 682 by conventional means, such as resistance welding. The preload spring 684 is rigidly adhesively bonded to substrate 670 over a relatively flat portion at the end of the preload spring opposite the coupling block end, and when assembled and compressed against surface 647 in cavity 642, it thereby resiliently biases the substrate 670 against the lower surface of the substrate 608 as it slides along the scale 606, which allows the present invention to apply the teachings of co-pending U.S. patent application Ser. No. 08/122, 909, entitled "Dielectric Coating For Capacitive Position Transducers To Reduce Sensitivity To Contaminants", now U.S. Pat. No. 5,416,424, most advantageously. At the same time, a guiding edge of the substrate 670 is in sliding contact with a guiding bearing surface on the side of the cavity 642. Thus, the coupling flexure 683 allows the substrate 670 to be guided by the lower surface of the measuring scale 606 on its upper side and by a side of the cavity 642 on its side. The substrate 670 is thus constrained in two axes to insure that both sets of electrodes 610, 676 are maintained in proper alignment as the substrate 670 moves along the scale 606.

During assembly, coupling block 682 (and its attached elements coupling flexure 683, preload spring 684 and substrate 670) is positioned in the orientation shown in FIGS. 10 and 11, so that coupling block through hole 685 is centered in groove 646. The coupling bar 656 is then inserted through lip seal 650, through the coupling block through-hole 685, and through lip seal 651, so that it can slide lengthwise in the internal groove 646. A coupling portion 617 of the coupling bar 656 inside the groove 646 is then rigidly bonded to the through-hole portion of coupling block 682 via a suitable conventional adhesive. The location of the coupling portion 617 on coupling bar 646 is chosen so that slider 690 may move freely over its intended measuring range without the assembly of elements attached to the coupling bar colliding with the ends of cavity 642 or the ends of groove 646. The portion of coupling block 682 extending down into internal groove 646 may also be designed to act as a sliding bearing when it reacts against the surfaces of the internal groove 646 under the spring forces of the coupling flexure 683, preload spring 684, and forces induced by any misalignment of the coupling bar 656; thereby reducing the stresses which might otherwise be transmitted to the bearing surfaces of substrate 670.

Extending from the bottom side of cavity enclosure 640, over a length roughly coinciding with the length of internal groove 646 and precisely fitting into the length and width of elongated recess 605, are groove outer walls 644, which completely surround internal groove 646 except for seal holes 648 and 649. These walls are preferably as thin as practical, as determined by the material strength and fabrication methods of cavity enclosure 640, which may be made of conventional molded plastic. As may best be seen in FIG. 10, the groove outer walls 644 terminate to coincide with the ends of elongated recess 605 and do not extend over portion 645 of the cavity body 640. Thus, coupling bar 656, flexure 672, and anchor pin 696 are free to move without interference in slot 698 under the flat bottom 690 of portion 645 of cavity body 640.

The flexure 672 is a single-degree-of-stiffness flexure that is stiff in the axial direction. Flexure 672 may be inserted and bonded into an axial hole in the end of the coupling bar 656, and likewise into a hole in anchor pin 696. Alternatively, flexure 672 may be secured into a hole in anchor pin 696 with a conventional set screw method (not shown), which may offer more convenient caliper assembly alternatives.

The flexure 672 is positioned so that, following assembly and installation it is in a nominally straight configuration. The flexure 672 provides two functions in the preferred embodiment: First, since it is stiff axially and compliant in other directions, it can actuate the substrate 670 along the length of the scale 606 with a high degree of accuracy. Secondly, flexure 672 can accommodate inisalignments of the coupling bar 656, the cavity 642 and the substrate 670 without inducing high stresses.

The final major component of the caliper 600 is a slider assembly 688. The slider assembly 688 includes a slider 690 that is configured so that it slides along the main beam 602 with its guide edge 692 contacting the mating side edge of the main beam 602, as required for accurate operation of the caliper 600. Conventional manual adjustment mechanisms 641 and pressure bar 643 may be used to adjust the distance between the slider guide edge 692 and the pressure bar 643 so that they exactly match the width of the main beam 602. The slider 690 is sized to match the form of the main beam 602 in a conventional manner. In the preferred embodiment, the slider assembly 688 also includes an anchor pin hole 695, preferably sized to receive a press fit of the anchor pin 696.

Once all internal assemblies are properly secured in place, the slider assembly 688 may be positioned on the main beam 602 and the anchor pin 696 may be secured in the anchor pin hole 695, thereby completing the axially rigid mechanical linkage between substrate 670 (the moving transducer measuring element) and the slider measuring surfaces 622 and 628.

Once the anchor pin 696 is properly secured in place, the bottom of housing 634 is sealed against cavity body 640, forming a sealed and enclosed cavity 642. The cavity enclosure 640 is secured to the housing such that cavity 642 is isolated by a watertight seal such as gasket 653 or sealant (not shown) completely around its periphery. Cavity enclosure 640 may be joined to housing 634 by inserting conventional miniature fasteners (not shown) through relief holes 607a, and then into a plurality of sets of aligned holes 607c and 607b and into threaded holes (not shown) on the underside of housing 634. The cavity enclosure 640 may be bonded to main beam 602 with adhesive. Alternatively, the entire assembly of main beam 602, cavity enclosure 640, gasket 653, and housing 634 can be secured at one time by inserting conventional miniature fasteners (not shown), through a plurality of sets of aligned holes 607a (not relief holes in this case), 607c and 607b and into threaded holes (not shown) on the underside of housing 634.

In the preferred embodiment, the portion 658 of the coupling bar 656 remains outside seal 651 when the measuring jaw surfaces 620, 622 or 626, 628 are open. When the jaw surfaces 620, 622 or 626, 628 are aligned with each other, the end 614 of the coupling bar 656 is fabricated to be flush with the end 616 of the main beam 602, to correspond to zero depth. By resting the end 616 of the main beam 602 on a surface and extending coupling bar 656 down into a hole, the hole depth can be measured by the caliper 600. Thus, in the preferred embodiment, the coupling bar 656 will have a portion 658 which functions exactly as does a conventional depth bar on a conventional caliper.

Although preferred and alternative embodiments of the inventive caliper have been shown in FIGS. 4–11 and described in detail herein, it will be understood to those skilled in the art that many other modifications and variations are possible without departing from the spirit of the invention. For example, although the external electronic assembly 624 is shown in FIGS. 10 and 11 as being connected to the stationary electrodes 610 attached to the main beam 602, an electronic assembly could instead be mounted on a slider assembly 688, similar to the construction of conventional electronic calipers, and connected via carefully routed fine wires to the movable electrodes 676 mounted on the substrate 670. In this configuration, the wires would be connected to electrodes 676 at the "coupling block end" of substrate 670; these connected electrodes, and the measuring scale electrodes 610, and all associated circuitry, would, for this configuration, be designed completely according to the teachings of U.S. Pat. No. 5,023,559 (which is the basis for the majority of presently available conventional electronic calipers). The fine wires would then be routed into a hole in the side of coupling bar 656, which would be a tube (sealed at end 614) in this configuration. The side hole would be adjacent to portion 617, where coupling block 682 attaches. The wires would then be routed through the coupling bar tube and come out the end adjacent to flexure 672 and this end of the tube would be sealed around the wires and flexure 672 with adhesive. Then the wires would be carefully routed so that they may be attached to a conventional processing electronics in a housing which spans the slider assembly, similar to the conventional electronics assembly 70 in FIG. 2. In this configuration "housing" 634 would have no electronics, and it would be replaced a simple mechanical cover sheet, thus allowing a low profile for the housing similar to electronics assembly 70 spanning slider assembly 688.

Still other variations of the inventive calipers 100 (FIGS. 4–7) and 600 (FIGS. 9–11) will also be apparent. For example, it is possible to connect a depth bar to a slider and extend it along the outside of a scale, and then use a linkage bar to connect the projecting end of the depth bar to a substrate inside a cavity. In such case, the depth bar effectively becomes a linkage bar, and the linkage bar effectively becomes a depth bar. Accordingly, it is the substance of the components, and not their name, that is important.

Other configurations and arrangements of main beams, covers, electronic housing and mating sliders may be used to achieve a sealed cavity, so long as the essential functions of the inventive configurations are preserved. Furthermore, the portion 658 of coupling bar 656 in FIG. 10 may be eliminated along with hole 649 and seal 651, if it is desired to economically duplicate the essential functions of cheaper conventional caliper models which offer no depth bar.

A preferred embodiment of the absolute capacitive electrode configuration which is taught in U.S. Pat. Nos. 5,023, 559 and 4,879,508 and which is well-suited to the present inventive mechanical configuration is shown in FIGS. 12, 13, 14 and 16. FIG. 15 shows an alternative electric embodiment. With reference to the description of the inventive caliper 600, the scale portion 606 and all of its electrodes 610 in FIG. 12 correspond to the scale portion 606 and the electrodes 610 in the inventive caliper 600 of FIG. 10. The substrate portion 670 and all of its electrodes 676 in FIG. 12 correspond to the substrate portion 670 and the electrodes 676 in the inventive caliper 600 of FIG. 10.

Figure 12:
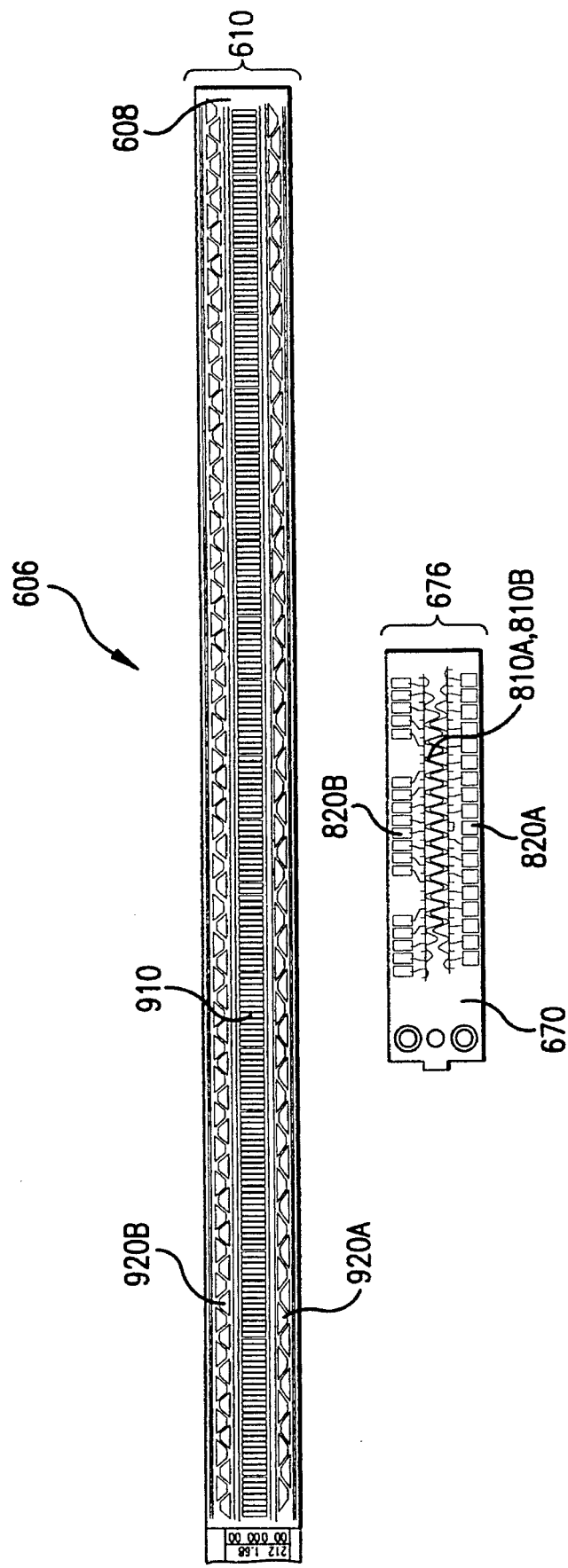
FIG. 12 is a view of the preferred capacitive electrode configuration for absolute measurement. used in the caliper of FIG. 10.

FIG. 12 shows a transducer which comprises a relatively shorter substrate member 670, and a linear measuring scale substrate 608 on which substrate member 670 is slidably positioned for longitudinal axial displacement with respect to substrate 608 so as to define a measurement axis X. This embodiment is adapted for making coarse, medium and fine resolution absolute measurements of measurement positions, thereby permitting highly precise absolute measurements to be obtained over a wide measuring range. As can be best seen in FIG. 13, disposed on the respective substrate members in respectively opposing relationships to each other, and in relative alignment with the measurement axis, are seven electrode arrays, generally denoted 810A, 810B, 820A, 820B, 910, 920A and 920B. Electrode arrays 810A, 810B, 820A and 820B together comprise the electrodes 676, of FIG. 10. Electrode arrays 910, 920A and 920B together comprise the electrodes 610, of FIG. 10.

Electrode arrays 810A and 810B disposed on substrate 670, as shown in FIG. 13, are interleaved arrays which are formed by two interleaved rows of discrete, electrically isolated electrodes 812A and 812B generally having identical, uniform sinusoidal geometries. Electrodes 812A are spaced apart from each other, and electrodes 812B are similarly spaced apart from each other, along the measurement axis by a uniform pitch $P_{r1}$ (corresponding edge to corresponding edge distance) defining a desired fine wavelength $W_f$. In the preferred embodiment, electrode arrays 810A and 810B have their end portions 815A, 815B, 816A and 816B configured such that the degree of coupling between them and electrode array 910 decreases linearly relative to the measurement axis along the extent of each end portion, in accordance with the teachings of U.S. Pat. No. 4,959,615, incorporated herein by reference, such that the respective directions of the decrease in the degree of coupling for the set of end portions 815A and 815B and the set of end portions 816A and 816B are opposite to each other, so that the effect of tilt between substrates 670 and 608 on a set of signals transferred between electrode array 910 and 810A or 810B is reduced.

Electrode array 910 disposed on substrate 608, as shown in FIG. 13, comprises a row of discrete electrodes 912 disposed in alignment with the measurement axis so as to be capacitively coupled to differing portions of the electrode arrays 810A and 810B depending on the relative positions of substrates 670 and 608. Electrodes 912 are spaced apart from each other along the measurement axis by a uniform pitch $P_{t1}$ (corresponding edge to corresponding edge distance) defining a desired transmitter wavelength $W_{t1}$ according to the relation $W_{t1}=8P_{t1}$. Electrodes 912 are interconnected in groups by standard printed circuit techniques such that each electrode in a first group of eight electrodes is connected to every eighth electrode thereafter.

Electrode array 820A disposed on substrate 670, as shown in FIG. 13, comprises a row of discrete electrodes 822A disposed in alignment with the measurement axis and adjacent to electrode array 810A on one side thereof. Electrodes 822A are spaced apart from each other along the measurement axis by a uniform pitch $P_{r2}$ (corresponding edge to corresponding edge distance). Each of the electrodes 822A is electrically connected via a connecting wire 824A to a corresponding one of the electrodes 812A such that each electrode 822A is spatially offset or displaced from the corresponding electrode 812A relative to the measurement axis by an amount $D_c(x)$ which is a predetermined function of the position of the electrode 822A relative to a reference position $R_c$ on the substrate 670, according to the teachings of U.S. Pat. No. 5,023,559 and 4,879,508, which are incorporated herein by reference.

Electrode array 820B disposed on substrate 670, as shown in FIG. 13, comprises a row of discrete electrodes 822B disposed in alignment with the measurement axis and adjacent to electrode array 810B on the side opposite from array 820A. Electrodes 822B are spaced apart from each other along the measurement axis by a uniform pitch $P_{f3}$ (corresponding edge to corresponding edge distance). Each of the electrodes 822B is electrically connected via a connecting wire 824B to a corresponding one of the electrodes 812B such that each electrode 822B is spatially offset or displaced from the corresponding electrode 812B relative to the measurement axis by an amount $D_m(x)$ which is a predetermined function of the position of the electrode 822B relative to a reference position $R_m$ on the substrate 670, according to the teachings of U.S. Pat. Nos. 5,023,559 and 4,879,508, which are incorporated herein by reference.

Electrode array 920A disposed on substrate 608, as shown in FIG. 13, comprises two electrodes 922A and 922A" having complementary configurations which are disposed adjacent to each other in relative alignment with the measurement axis so as to be capacitively coupled to differing portions of the electrode array 820A depending on the relative positions of substrates 670 and 608. Electrode 922A is composed of similarly shaped and orientated portions 930, which are all electrically connected (for instance by throughholes and backside connections, not shown, on substrate 608). Electrode 922A" is similarly composed of connected elements 932. Electrodes 922A and 922A" thus effectively have an elongate shape varying periodically relative to the measurement axis, defining a wavelength $W_{r2}$ and are connected alternately as positive and negative inputs to the signal processing circuitry or the signal generating circuitry during the coarse measurement mode.

Electrode array 920B disposed on substrate 608, as shown in FIG. 13, comprises two electrodes 922B and 922B" having complementary configurations which are disposed adjacent to each other in relative alignment with the measurement axis so as to be capacitively coupled to differing portions of the electrode array 820B depending on the relative positions of substrates 670 and 608. Electrode 922B is composed of similarly shaped and orientated portions 940, which are all electrically connected (for instance by throughholes and backside connections, not shown, on substrate 608). Electrode 922A" is similarly composed of connected elements 942. Electrodes 922B and 922B" thus effectively have an elongate shape varying periodically relative to the measurement axis, defining a wavelength $W_{r3}$ and are connected alternately as positive and negative inputs to the signal processing circuitry or the signal generating circuitry during the medium measurement mode. Electrode areas 955 constitute "ground plane" electrodes, and are connected to circuit ground so as to minimize leakage capacitance between electrodes 912 and adjacent electrode arrays 920A and 920B.

The following parameters are with reference to the preferred embodiment transducer having an electrode configuration as shown in FIG. 13.

Wavelengths:

$W_f = P_{r1}$ = Fine wavelength = 1.680 mm $W_m$ = Medium wavelength = $8 \cdot W_f$ = 13.440 mm $W_c$ = Coarse wavelength = $8 \cdot W_m$ = 107.520 mm (not shown in FIG. 13 because it would extend off the page)

$W_{t1}$ = Transmitter wavelength = $3 \cdot W_f$ = 5.040 mm $P_{r1}$ = Fine pitch = $W_f$ = 1.680 mm $P_{r3}$ = Medium pitch = $(8/(8+3)) \cdot W_f$ = 1.221818 mm $P_{r2}$ = Coarse pitch = $(64/(64+3)) \cdot W_f$ = 1.604776 mm $P_{t1}$ = Transmitter pitch = $(1/8) \cdot W_{t1}$ = $(3/8) \cdot W_f$ = 0.630 mm $Gap_{t1}$ = Transmitter gap = $P_{t1} - T_{t1}$ = 0.127 mm $T_{t1}$ = Transmitter width = 0.503 mm $W_{r3}$ = Transmitter wavelength adjusted for medium electrode scale = Wavelength of medium electrode shape = $3 \cdot P_{r3} = (3(8/(8+3))) \cdot W_f$ = 3.665455 mm $W_{r2}$ = Transmitter wavelength adjusted for coarse electrode scale = Wavelength of coarse electrode shape = $3 \cdot P_{r2} = (3(64/(64+3))) \cdot W_f$ = 4.814328 mm Excitation signal connection sequence for each group of N first transmitter electrodes:

Coarse/Medium measurement mode: 1-2-3-4-5-6-7-8

Fine measurement mode: 1-6-3-8-5-2-7-4

Figure 14:
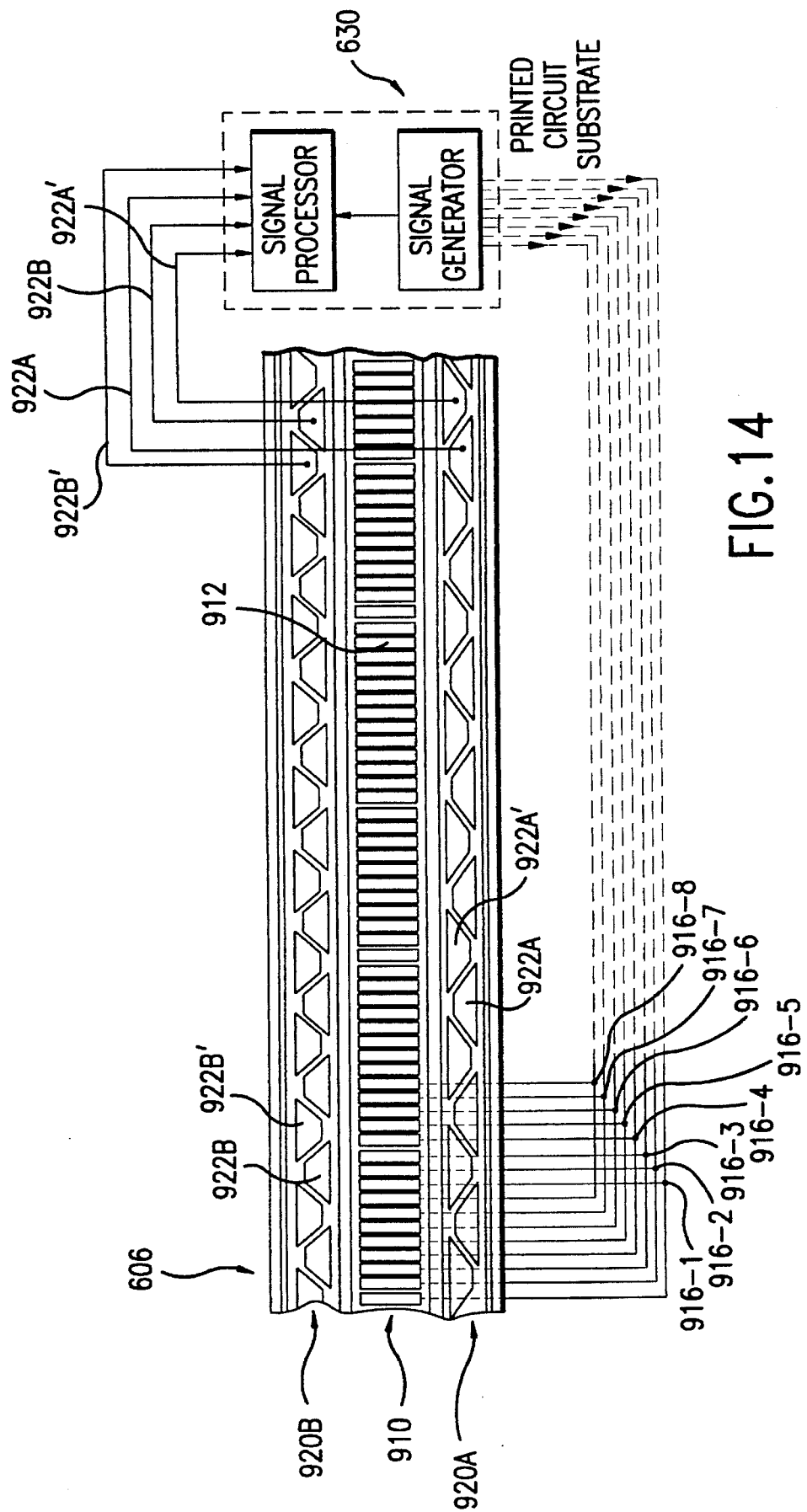
FIG. 14 is a partly schematic, partly diagrammatic view of one embodiment of electronic connections for the absolute capacitive electrode configuration shown in FIGS. 12 and 13.
Figure 15:
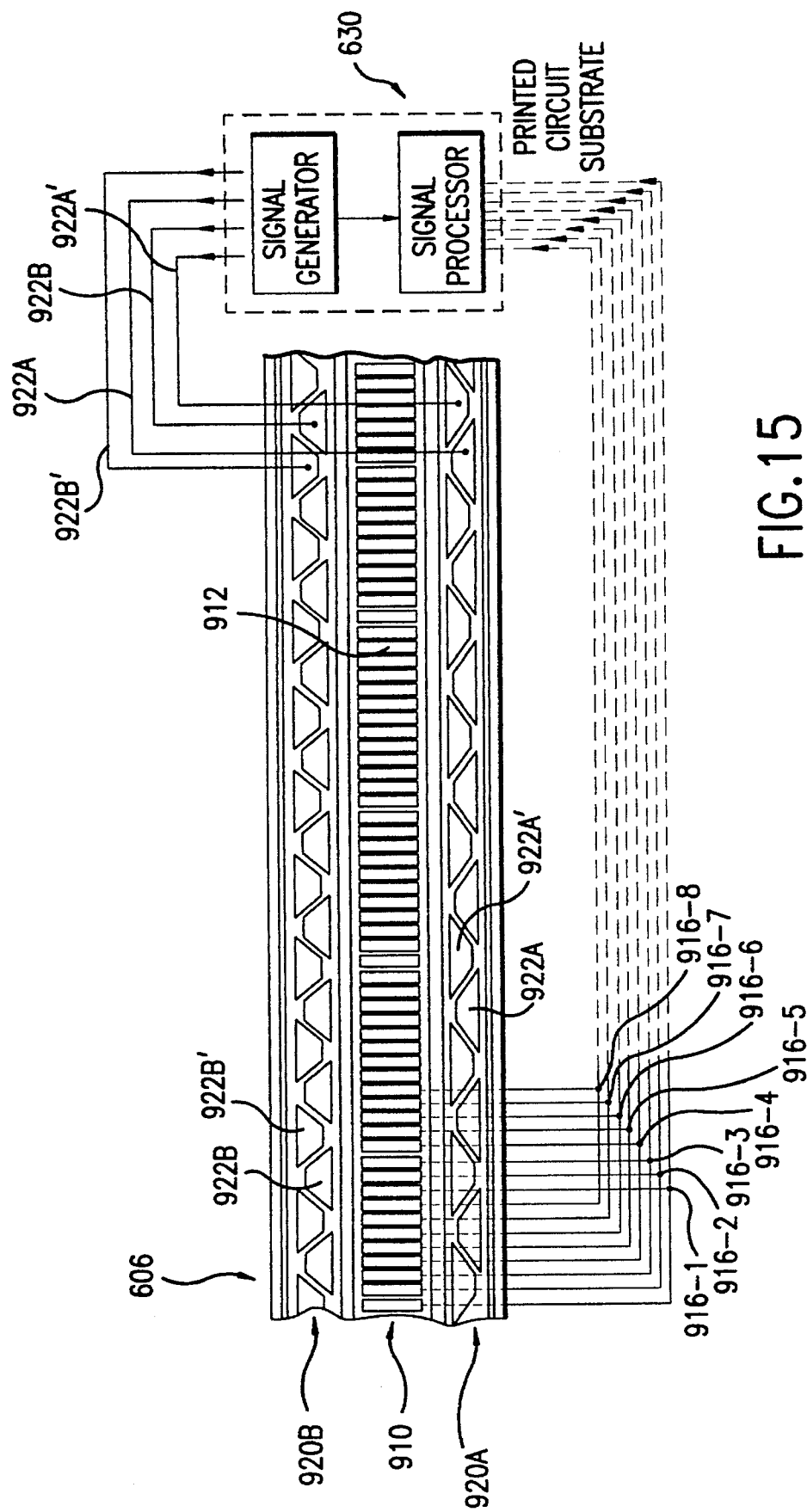
FIG. 15 is a partly schematic, partly diagrammatic view of an alternate embodiment of electronic connections for the absolute capacitive electrode configuration shown in FIGS. 12 and 13.

FIGS. 14 and 15 correspond to FIGS. 1A and 1B of U.S. Pat. No. 5,023,559, respectively. FIG. 14 shows the preferred embodiment for electronic connections according to the present invention and the principles of U.S. Pat. No. 5,023,559. FIG. 15 shows an alternative embodiment for electronic connections, according to the principles of U.S. Pat. No. 5,023,559. The signal processor and signal generator units which are general references to the circuitry found on printed circuit substrate 630 in FIGS. 14 and 15 are identical to the corresponding elements shown in FIGS. 1A and 1B respectively, of U.S. Pat. No. 5,023,559, which is incorporated herein by reference. In the embodiment of FIG. 15 the direction of signal transmission through the transducer is reversed from that of the FIG. 14 embodiment. The physical configurations of the various electrode structures advantageously are the same regardless of the direction of signal transmission through the transducer shown in FIGS. 14 and 15. FIGS. 14 and 15 also show transducer circuit nodes 922A, 922A", 922B, and 922B", and transducer circuit nodes 916-1 to 916-8, to which are respectively connected the first electrodes in each group of N electrodes according to the relative order in which the electrodes are physically arranged in the group.

Figure 16:
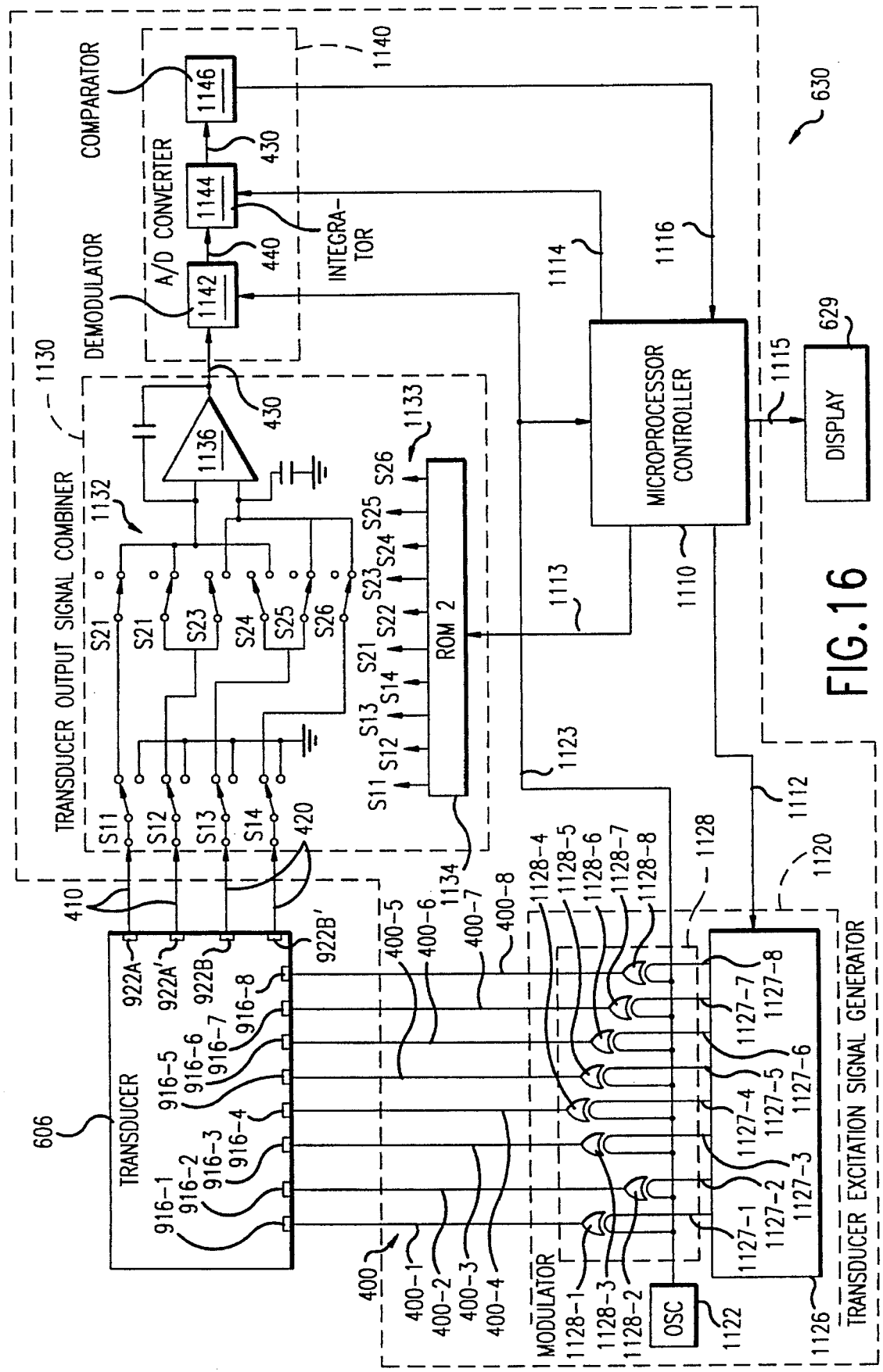
FIG. 16 is a schematic block diagram of an exemplary embodiment of a measuring circuit which is adapted for the caliper embodiment of FIGS. 12, 13, and 14.

FIGS. 14 and 15 correspond to FIGS. 1A and 1B of U.S. Pat. No. 5,023,559, respectively. A preferred embodiment of conventional transducer signal processing and display electronics 630 for the caliper embodiment of FIGS. 14 is shown in more detail in FIG. 16. FIG. 16 corresponds to FIG. 5 of U.S. Pat. No. 5,023,559, which is incorporated herein by reference. As shown, conventional transducer signal processing and display electronics 630 of FIG. 16 comprises a microprocessor controller 1110 for controlling the operation of the other components and doing necessary calculations in combining the measurement data; a transducer excitation signal generator 1120 for producing predetermined group phase combinations of excitation signals 400 responsive to control signals 1112 produced by controller 1110; a transducer output signal combiner 1130 responsive to control signals 1113 produced by controller 1110 for selectively connecting the outputs 410 of the electrode array 920A and the outputs 420 of the electrode array 920B in different combinations to produce resulting transducer output signals 430 for subsequent processing dependent on the measurement mode, a dual-ramp A/D converter 1140 responsive to control signals 1114 for converting the amplitude ratios of pairs of successive resultant transducer output signals 430, and a display 629 responsive to output signals 1115 produced by controller 1110 for displaying the values of the positions. calculated by controller 1110. As shown in FIG. 16, transducer excitation signal generator 1120 comprises a clock oscillator 1122 for producing a high frequency square wave clock signal 1123, and a modulator 1128 for producing predetermined sequences (i.e. group phase combinations) of inverted and noninverted signals 1123 as transducer excitation signals 400. As shown in FIG. 16, modulator 1128 comprises an array of N exclusive-OR logic gates 1128-1 to 1128-8, each gate having one input connected to the clock signal 1123 and the other input connected to the gate control signal 1127-1 to 1127-8 produced by a read-only memory 1126 (ROM 1) in response to controller signals 1112.

As shown in FIG. 16, the respective excitation signals 400 produced by excitation signal generator 1120 are connected in fixed consecutive numerical sequence to corresponding ones of the transducer input circuit nodes 916-1 to 916-8, to which are respectively connected the first transmitter electrodes in each group of N electrodes according to the relative order in which the electrodes are physically arranged in the group, as opposed to the order of the relative fine wavelength segment (phase) positions occupied by the group electrodes. That is, the first signal 400-1 is applied to the first transmitter electrode 9 12-1. in each group, the second signal 400-2 is applied to the second transmitter electrode 912-2 in each group, and so on, with the Nth signal 400-N being applied to the Nth transmitter electrode 912-N in each group. The connection from the transducer input circuit nodes 916-1 to 916-8 to the transducer excitation signal generator 1120 are made via circuit traces 611 (not shown), which are formed on the upper surface of the scale 606, as shown in FIG. 10, so that the circuit connections may be made through a conventional elastomeric connector 620.

As shown in FIG. 16, transducer output signal combiner 1130 comprises an electronic switching network, generally denoted 1132, responsive to binary switch control signals 1133 produced by a read-only memory (ROM 2) in response to two bit word controller signals 1113 indicating the measurement mode, and a differential amplifier circuit 1136 connected to the outputs of switching network 1132 and producing resultant transducer output signals 430 as an output. As shown in FIG. 16, switching network 1132 has four input terminals A, B, C and D, to which are respectively connected the transducer outputs 410 and 420.

As shown in FIG. 16, A/D converter 1140 comprises a synchronous demodulator 1142, which is controlled by the same clock signal 1123 used to generate excitation signals 400, for producing a demodulated DC transducer signal 440 that is proportional to the amplitude of the resultant transducer output signal 430 produced by signal combiner 1130; an integrator 1144 responsive to control signals 1114 for dual-ramp integrating pairs of transducer signals 440; and a comparator 1146 for detecting the polarity and zero crossings of the integrated output signals 450 produced by integrator 1144 and producing feedback signals 1115 for use by controller 1110.

The preferred electrode configuration shown in FIGS. 12, 13, 14 and 15 is constructed according to the teachings and claims of U.S. Pat. Nos. 5,023,559 and 4,879,508. However, in the present preferred embodiment the electrodes are configured to allow the relatively longer measuring scale substrate 608 to be operably connected to the electronics, while the relatively shorter substrate member 670 is not connected.

To duplicate the function of the conventional incremental measuring function type electronic calipers which currently predominate, the inventive caliper is able to use the same electronic circuitry and incremental type electrode configurations as traditional electronic calipers 10. To duplicate the function of the newer absolute measuring function type electronic calipers according to U.S. Pat. No. 5,023,559 which have appeared on the market, the inventive caliper is able to use the same electronic circuitry, with an improved capacitive electrode configuration which is well-suited to the present invention. It is thus seen that the inventive caliper preserves the form, operation, feel, and functions of traditional calipers. Yet, because the moveable electrodes are positioned inside an enclosed cavity that is open only through a very small seal, it is insensitive to environmental contaminants. Moreover, although the invention is shown as solving contamination problem for capacitive electronic calipers, it will be understood that it is readily applicable to virtually any type of electronic caliper using a transducing principle wherein a relatively narrow, relatively short transducer element must be moved along a relatively narrow longer transducer element comprising a measuring scale, and also for other types of gauges which use a capacitive electrode transducer as the measuring element. It will therefore be understood that the preferred embodiments described herein are for illustration only and should not be used to limit the scope of the claims.

We claim:

1. A capacitive electronic caliper having reduced sensitivity to environmental contaminants, comprising:

an elongated main beam mechanically coupled to a first position determining member, said main beam having a hollow interior thereby forming an elongated cavity;

a first set of electrodes fixed within said elongated cavity in said main beam, said first set of electrodes forming a pattern extending over a measuring range along the length of said main beam;

a slider mechanically coupled to a second position determining member, said slider being slidably mounted on said main beam so that the position of said slider on said main beam is indicative of the relative distance between said first and second position determining members;

a second set of electrodes fabricated on a substrate operably positioned in the cavity of said main beam so that said second set of electrodes can move along the length of said first set of electrodes to form an operable set of capacitive encoder electrodes;

a coupling mechanism mechanically coupling said slider to said substrate so that the relative movement between said first and second position determining members corresponds to the relative movement between said first and second set of electrodes;

a sealing mechanism to isolate said cavity from the external environment while allowing said coupling mechanism to mechanically couple said slider to said second set of electrodes; and electronic circuitry connected to one of said sets of electrodes, said electronic circuitry applying signals to and receiving signals from said set of electrodes in order to provide an indication of the relative position between said first and second position determining members as a function of the capacitive coupling between said first and second sets of electrodes.

2. The capacitive electronic caliper of claim 1 wherein said coupling mechanism includes a first elongated bar extending along said main beam, said first elongated bar having one end connected to said slider and another end connected to said substrate.

3. The capacitive electronic caliper of claim 2 wherein said first elongated bar extends along said main beam outside of said cavity, wherein said coupling mechanism further includes a second bar coupled to said substrate and extending axially along said main beam inside said cavity, said second bar extending through an aperture formed in an end wall of said cavity and projecting out of said cavity toward a first end of said main beam; said second bar being connected to said first bar so that said first bar and said second bar mechanically couple said substrate to said slider whereby the relative movement between said first and second sets of electrodes corresponds to the relative movement between said main beam and said slider, and wherein said scaling mechanism includes a seal positioned at said aperture to isolate said cavity from the external environment while allowing said second bar to move axially through said aperture.

4. The capacitive electronic caliper of claim 3, further including a third bar projecting from said slider parallel along the length of said main beam, the portion of said third bar projecting toward said first end of said main beam being connected to the junction between said first bar and said second bar, all three bars lying approximately in the same plane with said second bar positioned midway between said first and third bars so that the relative position between said first and second sets of electrodes is relatively insensitive to bending of said bars.

5. The capacitive electronic caliper of claim 3 wherein the projecting end of said second bar is flush with said first end of said main beam when said first and second position determining members are in their zero position so that said second bar can be used as a depth gauge for measuring the depth of a hole or step formed in a surface by placing said first end of said main beam on said surface and placing the projecting end of said second bar against the bottom of said hole or step.

6. The capacitive electronic caliper of claim 5 wherein a projecting end of said first bar is connected to said second bar at a location spaced axially apart from the projecting end of said second bar so that said caliper can be used to measure the depth of relatively narrow holes by inserting only said second bar into said holes.

7. The capacitive electronic caliper of claim 3 wherein said first and second bars are hollow thereby forming respective tubular passages, and wherein electric wires connecting said electronic circuitry to said second set of electrodes extend through said hollow passages.

8. The capacitive electronic caliper of claim 2 wherein said first elongated bar extends along said main beam through said elongated cavity, and wherein said coupling mechanism further includes a coupling member extending from said slider into said elongated cavity where said coupling member is connected to said first elongated bar, and a link mechanism positioned within said cavity and connecting said first elongated bar to said substrate.

9. The capacitive electronic caliper of claim 8 wherein said elongated cavity is divided into first and second elongated cavity sections having an aperture extending therebetween through which said elongated bar passes so that said first elongated bar extends into said first and second elongated cavity sections, wherein said coupling mechanism connects said slider to said first elongated bar in said first cavity section, wherein said link mechanism connects said first elongated bar to said substrate in said second cavity section, and wherein said sealing mechanism includes a seal surrounding said first elongated bar as it passes through said aperture to isolate the first and second cavity sections from each other.

10. The capacitive electronic caliper of claim 1 wherein said electronic circuitry is connected to said first set of electrodes.

11. The capacitive electronic caliper of claim 1 wherein said electronic circuitry is connected to said second set of electrodes.

12. The capacitive electronic caliper of claim 1 wherein said electronic circuitry is mounted on said main beam.

13. The capacitive electronic caliper of claim 1 wherein said electronic circuitry is mounted on said slider.

14. A capacitive transducer for measuring the position between first and second objects, said transducer comprising:

an elongated main beam mechanically coupled to said first object, said main beam having a hollow interior thereby forming an elongated cavity;

a first set of electrodes mounted within said elongated cavity to form a pattern extending along the length of said main beam;

a substrate positioned in said cavity adjacent said first set of electrodes, said substrate being slidably mounted in said cavity so that said substrate can move along a measurement axis extending from one end of said cavity to another;

a second set of electrodes fabricated on said substrate, said second set of electrodes having a pattern that allows the relative position between said first and second set of electrodes along the length of said main beam to be determined by the capacitive coupling between said first and second sets of electrodes;

an elongated mechanical coupling member extending from the substrate axially inside said elongated cavity and through an aperture formed in one of the end walls of said cavity, said mechanical coupling member being mechanically coupled to said second object so that the relative movement between said first and second sets of electrodes corresponds to the relative movement between first and second objects;

a seal positioned at said aperture to isolate said cavity from the external environment while allowing said coupling member to move axially through said aperture; and electronic circuitry connected to one of said sets of electrodes, said electronic circuitry applying signals to and receiving signals from said set of electrodes in order to provide an indication of the relative position between said first and second objects as a function of the capacitive coupling between said first and second sets of electrodes.

15. The capacitive transducer of claim 14 wherein said electronic circuitry is connected to said first set of electrodes.

16. The capacitive transducer of claim 14 wherein said electronic circuitry is connected to said second set of electrodes.

17. The capacitive transducer of claim 16 wherein said electronic circuitry is connected to said second set of electrodes through a plurality of conductors, and wherein said conductors are carried into said cavity by said mechanical coupling member.

18. In a capacitive electronic caliper of the type having an elongated main beam mechanically coupled to a first position measuring member, a first set of electrodes mounted on said main beam form a pattern extending along the length of said main beam, a slider mechanically coupled to a second position measuring member, said slider being slidably mounted on said main beam so that the position of said slider on said main beam is indicative of the relative position between said first and second position measuring members, and a second set of electrodes having a pattern that allows the relative position between said first and second set of electrodes along the length of said main beam to be determined by the capacitive coupling between said first and second sets of electrodes, a method of making said caliper less sensitive to contaminants, said method comprising:

positioning said first and second set of electrodes in an enclosed cavity extending along the length of said main beam so that said second set of electrodes can move along the length of said scale while capacitively interacting with said first set of electrodes; and mechanically coupling said slider to said second set of electrodes.

19. The method of claim 18, further including the steps of forming an aperture at one end of said cavity, and mechanically coupling said second set of electrodes to said slider through said aperture.

20. The method of claim 19, further including the steps of sealing around said mechanical coupling at said aperture to prevent contaminants from reaching said first and second set of electrodes in said cavity.

21. A capacitive electronic caliper having reduced sensitivity to environmental contaminants, comprising:

an elongated main beam mechanically coupled to a first position measuring member, said main beam having a hollow interior thereby forming an elongated cavity:

a first set of electrodes fixed within said elongated cavity in said main beam, said first set of electrodes forming a pattern extending over a measuring range along the length of said main beam;

a slider mechanically coupled to a second position measuring member, said slider being slidably mounted on said main beam so that the position of said slider on said main beam is indicative of the relative position between said first and second position measuring members;

a second set of electrodes fabricated on a substrate positioned in the cavity of said main beam so that said second set of electrodes is operably positioned relative to said first set of electrodes and said substrate can move along the length of said main beam;

a bar extending from an aperture in an end wall of said cavity axially along said main beam into said cavity, said bar being mechanically coupled to said slider outside said cavity and to said substrate inside said cavity so that said bar mechanically couples said substrate to said slider whereby the relative movement between said first and second sets of electrodes corresponds to the relative movement between said main beam and said slider;

a seal positioned at said aperture to isolate said cavity from the external environment while allowing said bar to move axially through said aperture; and electronic circuitry connected to one of said sets of electrodes, said electronic circuitry applying signals to and receiving signals from said set of electrodes in order to provide an indication of the relative position between said first and second position measuring members as a function of the capacitive coupling between said first and second sets of electrodes.

22. The capacitive electronic caliper of claim 21 wherein said electronic circuitry is connected to said first set of electrodes.

23. The capacitive electronic caliper of claim 21 wherein said electronic circuitry is connected to said second set of electrodes.

24. The capacitive electronic caliper of claim 23 wherein said bar is hollow thereby forming a tubular passage, and wherein electric wires connecting said electronic circuitry to said second set of electrodes extend through said hollow passage.

25. The capacitive electronic caliper of claim 21 wherein said electronic circuitry is mounted on said main beam.

26. The capacitive electronic caliper of claim 21 wherein said electronic circuitry is mounted on said slider.

27. The capacitive electronic caliper of claim 21 wherein one end of said bar projects through an aperture in an end of said main beam such that the projecting end of said bar is flush with the end of said main beam when said first and second position measuring members are in a predefined zero position, whereby the end of said bar projects beyond the end of said main beam when said first and second position measuring members are displaced from said zero position so that said bar can be used as a depth gauge for measuring the depth of a hole formed in a surface by placing the end of said main beam on said surface and placing the projecting end of said bar against the bottom of said hole.

28. An electronic caliper having reduced sensitivity to environmental contaminants, comprising:

an elongated main beam mechanically coupled to a first position measuring member, said main beam having a hollow interior thereby forming an elongated cavity;

an elongated first position transducer element fixed within said elongated cavity in said main beam, said first position transducer element extending over a measuring range along the length of said main beam;

a slider mechanically coupled to a second position measuring member, said slider being slidably mounted on said main beam so that the position of said slider on said main beam is indicative of the relative position between said first and second position measuring members;

a second position transducer element positioned in the cavity of said main beam so that said second position transducer element is operably positioned relative to said first position transducer element and can move along the length of said first position transducer element;

a bar extending axially along said main beam and into said cavity through an aperture in an end wall of said cavity, said bar being mechanically coupled to said slider outside said cavity and to said second position transducer element inside said cavity so that said bar mechanically couples said second position transducer element to said slider whereby the relative movement between said first and second position transducer elements corresponds to the relative movement between said main beam and slider;

a seal positioned in said aperture to isolate said cavity from the external environment while allowing said bar to move axially through said aperture; and electronic circuitry operably connected to at least one of said first and second position transducer elements to provide signals to and receive signals from said position transducer element to provide an indication of the relative position between said first and second position measuring members as a function of an interaction between said first and second position transducer elements.

29. The electronic caliper of claim 28 wherein said electronic circuitry is connected to said first position transducer element.

30. The electronic caliper of claim 28 wherein said electronic circuitry is connected to said second position transducer element.

31. The electronic caliper of claim 28 wherein said electronic circuitry is mounted on said main beam.

32. The electronic caliper of claim 28 wherein said electronic circuitry is mounted on said slider.

33. The electronic caliper of claim 28 wherein one end of said bar projects through an aperture in an end of said main beam such that the projecting end of said bar is flush with the end of said main beam when said first and second position measuring members are in a predefined zero position, whereby the end of said bar projects beyond the end of said main beam when said first and second position measuring members are displaced from said zero position so that said bar can be used as a depth gauge for measuring the depth of a hole formed in a surface by placing the end of said main beam on said surface and placing the projecting end of said bar against the bottom of said hole.

34. The electronic caliper of claim 28 wherein said first and second position transducer elements comprise respective arrays of electrodes with the electrodes of said first position transducer element being capacitively coupled to the electrodes of said second position transducer element so that said first and second position transducer elements form a capacitive position encoder.

35. A method for manufacturing a capacitive electronic caliper having reduced sensitivity to environmental contaminants, comprising:

mechanically coupling an elongated main beam to a first position determining member, the main beam having a hollow interior forming an elongated cavity;

fixing a first set of electrodes within the elongated cavity, the first set of electrodes forming a pattern extending over a measuring range along the length of the main beam;

mechanically coupling a slider to a second position determining member, the slider slidably mounted on the main beam, a position of the slider on the main beam indicative of a relative distance between the first and second position determining members;

fabricating a second set of electrodes on a substrate operably positioned in the cavity of the main beam, the second set of electrodes movable along the length of the first set of electrodes to form an operable set of capacitive encoder electrodes;

mechanically coupling the slider to the substrate by a coupling mechanism, relative movement between the first and second position determining members corresponding to relative movement between the first and second sets of electrodes;

providing a sealing mechanism to isolate the cavity from the external environment, the sealing mechanism allowing the coupling mechanism to mechanically couple the slider to the second set of electrodes; and connecting electronic circuitry to one of the sets of electrodes, the electronic circuitry applying signals to and receiving signals from the set of electrodes to provide an indication of the relative position between the first and second position determining members as a function of the capacitive coupling between the first and second sets of electrodes.

36. A method for manufacturing a capacitive electronic caliper having reduced sensitivity to environmental contaminants, the capacitive transducer measuring a position between first and second objects, the method comprising:

mechanically coupling an elongated main beam to the first object, the main beam having a hollow interior forming an elongated cavity;

mounting a first set of electrodes within the elongated cavity to form a pattern extending along the length of the main beam;

positioning a substrate in the cavity adjacent the first set of electrodes, the substrate slidably mounted in the cavity, the substrate moveable along a measurement axis extending from one end of the cavity to another;

fabricating a second set of electrodes on the substrate, the second set of electrodes having a pattern, a relative position between the first and second set of electrodes along the length of the main beam determined by capacitive coupling between the first and second sets of electrodes;

mechanically coupling a mechanical coupling member to the second object, the elongated mechanical coupling member extending from the substrate axially inside the elongated cavity and through an aperture formed in one of the end walls of the cavity, relative movement between the first and second sets of electrodes corresponding to relative movement between first and second objects;

positioning a seal at the aperture to isolate the cavity from the external environment, the seal allowing the coupling member to move axially through the aperture; and connecting electronic circuitry to one of the sets of electrodes, the electronic circuitry applying signals to and receiving signals from the set of electrodes to provide an indication of the relative position between the first and second objects as a function of the capacitive coupling between the first and second sets of electrodes.

37. A method for manufacturing a capacitive electronic caliper having reduced sensitivity to environmental contaminants, comprising:

mechanically coupling an elongated main beam to a first position measuring member, the main beam having a hollow interior forming an elongated cavity:

fixing a first set of electrodes within the elongated cavity in the main beam, the first set of electrodes forming a pattern extending over a measuring range along the length of the main beam;

mechanically coupling a slider to a second position measuring member, the slider slidably mounted on the main beam, a position of the slider on the main beam indicative of relative position between the first and second position measuring members;

fabricating a second set of electrodes on a substrate positioned in the cavity of the main beam, the second set of electrodes operably positioned relative to the first set of electrodes, the substrate moveable along the length of the main beam;

mechanically coupling a bar to the slider outside the cavity and to the substrate inside the cavity, the bar extending from an aperture in an end wall of the cavity axially along the main beam into the cavity, relative movement between the first and second sets of electrodes corresponding to relative movement between the main beam and the slider;

positioning a seal at the aperture to isolate the cavity from an external environment while allowing the bar to move axially through the aperture; and connecting electronic circuitry to one of the sets of electrodes, the electronic circuitry applying signals to and receiving signals from the set of electrodes in order to provide an indication of the relative position between the first and second position measuring members as a function of the capacitive coupling between the first and second sets of electrodes.

38. A method for manufacturing an electronic caliper having reduced sensitivity to environmental contaminants, comprising:

mechanically coupling an elongated main beam to a first position measuring member, the main beam having a hollow interior forming an elongated cavity;

fixing an elongated first position transducer element within the elongated cavity in the main beam, the first position transducer element extending over a measuring range along the length of the main beam;

mechanically coupling a slider to a second position measuring member, the slider slidably mounted on the main beam, a position of the slider on the main beam indicative of relative position between the first and second position measuring members;

positioning a second position transducer element in the cavity of the main beam, the second position transducer element operably positioned relative to the first position transducer element and moveable along the length of the first position transducer element;

mechanically coupling a bar to the slider outside the cavity and to the second position transducer element inside the cavity, the bar extending axially along the main beam and into the cavity through an aperture in an end wall of the cavity, relative movement between the first and second position transducer elements corresponding to relative movement between the main beam and slider;

positioning a seal in the aperture to isolate the cavity from an external environment while allowing the bar to move axially through the aperture; and operably connecting electronic circuitry to at least one of the first and second position transducer elements to provide signals to and receive signals from the position transducer element to provide an indication of the relative position between the first and second position measuring members as a function of an interaction between the first and second position transducer elements.

* * * * *